United States Patent
Adler et al.

(10) Patent No.: US 11,662,479 B2
(45) Date of Patent: May 30, 2023

(54) METHODS AND SYSTEMS FOR PRINTED CIRCUIT BOARD DESIGN BASED ON AUTOMATIC CORRECTIONS

(71) Applicant: Bruker Nano, Inc., Santa Barbara, CA (US)

(72) Inventors: David Lewis Adler, San Jose, CA (US); Freddie Erich Babian, Palo Alto, CA (US); Scott Joseph Jewler, San Jose, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 189 days.

(21) Appl. No.: 17/325,591

(22) Filed: May 20, 2021

(65) Prior Publication Data
US 2021/0279878 A1 Sep. 9, 2021

Related U.S. Application Data

(63) Continuation of application No. 16/924,769, filed on Jul. 9, 2020, now Pat. No. 11,042,981.
(Continued)

(51) Int. Cl.
*G01T 1/20* (2006.01)
*G06N 20/00* (2019.01)
(Continued)

(52) U.S. Cl.
CPC ............ *G01T 1/20* (2013.01); *G01N 23/04* (2013.01); *G01N 23/043* (2013.01);
(Continued)

(58) Field of Classification Search
CPC ..... G06T 7/0014; G06T 5/007; G06T 7/0012; G06T 2207/10081; G06T 2207/10116;
(Continued)

(56) References Cited

U.S. PATENT DOCUMENTS 6,859,915 B1 * 2/2005 Frank ...................... G06F 30/39
716/112
8,549,444 B2 * 10/2013 Dangler ................ H01P 11/003
716/132
(Continued)

FOREIGN PATENT DOCUMENTS

WO WO-2022086671 A1 * 4/2022 ............. G01R 27/16

*Primary Examiner* — Suresh Memula
(74) *Attorney, Agent, or Firm* — Boyle Fredrickson S.C.

(57) ABSTRACT

In one embodiment, a computing system may access design data of a printed circuit board to be produced by a manufacturing process. The system may determine one or more corrections for the design data of the printed circuit board based on one or more correction rules for correcting one or more parameters associated with the printed circuit board. The system may automatically adjust one or more of the parameters associated with the design data of the printed circuit board based on the one or more corrections. The adjusted parameters may be associated with an impedance of the printed circuit board. The one or more corrections may cause the impendence of the printed circuit board to be independent from layer thickness variations of the printed circuit board to be produced by the manufacturing process.

20 Claims, 10 Drawing Sheets

Related U.S. Application Data

(60) Provisional application No. 62/873,752, filed on Jul. 12, 2019.

(51) Int. Cl.

| | |
|---|---|
| *G06F 30/398* | (2020.01) |
| *G01N 23/04* | (2018.01) |
| *G01N 23/083* | (2018.01) |
| *G01N 23/18* | (2018.01) |
| *G06T 5/00* | (2006.01) |
| *G06T 7/00* | (2017.01) |
| *H01L 21/67* | (2006.01) |
| *H05K 1/11* | (2006.01) |
| *H05K 3/40* | (2006.01) |
| *G06F 18/24* | (2023.01) |
| *G06F 18/214* | (2023.01) |
| *G06V 10/82* | (2022.01) |
| *G06F 119/18* | (2020.01) |
| *G06F 115/12* | (2020.01) |

(52) U.S. Cl.
CPC ............ *G01N 23/083* (2013.01); *G01N 23/18* (2013.01); *G06F 18/214* (2023.01); *G06F 18/24* (2023.01); *G06F 30/398* (2020.01); *G06N 20/00* (2019.01); *G06T 5/007* (2013.01); *G06T 7/0012* (2013.01); *G06T 7/0014* (2013.01); *G06V 10/82* (2022.01); *H01L 21/67288* (2013.01); *H05K 1/115* (2013.01); *H05K 3/4038* (2013.01); *G01N 2223/04* (2013.01); *G01N 2223/401* (2013.01); *G01N 2223/426* (2013.01); *G01N 2223/505* (2013.01); *G01N 2223/6466* (2013.01); *G06F 2115/12* (2020.01); *G06F 2119/18* (2020.01); *G06T 2207/10081* (2013.01); *G06T 2207/10116* (2013.01); *G06T 2207/20024* (2013.01); *G06T 2207/20081* (2013.01); *G06T 2207/20208* (2013.01); *G06T 2207/30004* (2013.01)

(58) Field of Classification Search
CPC . G06T 2207/20024; G06T 2207/20081; G06T 2207/20208; G06T 2207/30004; G06N 20/00; G06F 30/398; G06F 18/24; G06F 18/214; G06F 2119/18; G06F 2115/12; G01N 23/04; G01N 23/043; G01N 23/083; G01N 23/18; G01N 2223/04; G01N 2223/401; G01N 2223/426; G01N 2223/505; G01N 2223/6466; G01T 1/20; H01L 21/67288; H05K 1/115; H05K 3/4038
USPC .......................................................... 716/136
See application file for complete search history.

(56) References Cited

U.S. PATENT DOCUMENTS

| | | | | |
|---|---|---|---|---|
| 8,863,046 | B2* | 10/2014 | Dangler | H05K 1/024 |
| | | | | 716/132 |
| 10,750,616 | B2* | 8/2020 | Christo | G06F 30/398 |
| 2009/0255713 | A1* | 10/2009 | Dangler | G06F 30/23 |
| | | | | 174/250 |
| 2013/0075147 | A1* | 3/2013 | Amano | H05K 1/0373 |
| | | | | 174/264 |
| 2013/0132922 | A1* | 5/2013 | Yamamoto | H05K 1/025 |
| | | | | 716/127 |
| 2015/0068788 | A1* | 3/2015 | Amano | H05K 1/0271 |
| | | | | 174/251 |
| 2020/0060026 | A1* | 2/2020 | Christo | H05K 3/0005 |

\* cited by examiner

METHODS AND SYSTEMS FOR PRINTED CIRCUIT BOARD DESIGN BASED ON AUTOMATIC CORRECTIONS

PRIORITY

This application is a continuation under 35 U.S.C. § 120 of U.S. patent application Ser. No. 16/924,769, filed 9 Jul. 2020, which claims the benefit under 35 U.S.C. § 119(e) of U.S. Provisional Patent Application No. 62/873,752, filed 12 Jul. 2019, which is incorporated herein by reference.

TECHNICAL FIELD

This invention relates to printed circuit board designing and manufacturing techniques.

BACKGROUND

A printed circuit board (PCB) may include one or more layers of non-conductive substrates with conductive material laminated to these substrates. The non-conductive substrates may serve as mechanical supports for the conductive material. The conductive material may form a number of electrical transmission lines for transmitting electrical signals. To allow the PCB to work appropriately, the transmission lines need to have specific performance parameters satisfying corresponding performance requirements as set by PCB designers.

However, after the PCB designs are sent to manufacturer, the manufacturer engineers may tweak the PCB designs based on the manufacturing process requirements. As a result, the manufactured PCBs may have different performance parameters with respect to corresponding specification as set by the PCB designers. These differences may prevent the manufactured PCBs from working appropriately. The manufactured PCBs may be tested electrically to identify these problems. The PCB designers may adjust the PCB designs based on the electrical testing result and re-send the adjusted PCB designs to manufacturer to repeat the whole process. This process may go back-and-forth for many iterations and could be time and resource consuming.

SUMMARY OF PARTICULAR EMBODIMENTS

Particular embodiments described herein relate to systems and methods for using an expert system to analyze PCB design and generate automatic corrections for the analyzed PCB designs at the designing stage before the PCB designs are sent to manufacturers. The expert system may include a machine-learning (ML) model or/and a rule-based algorithm to generate automatic corrections for PCB designs. The system may use an X-ray inspection system to inspect a number of PCB products to measure the metrology information of these inspected PCB products and generate the X-ray inspection data (e.g., X-ray images and metrology information). Then, the system may use the X-ray inspection data and corresponding PCB designs to train the ML model on how to tweak or modify the PCB designs to achieve the target performance as intended by the designers. The system may include a rule-based algorithm including a number of rules that are generated based on experiential knowledge of the manufacturer engineers for tweaking or modifying PCB designs to achieve the target performance as intended by the designers. At run time, the system may generate corrections or modifications for PCB designs at the designing stage based on ML model inference or one or more PCB correcting rules generated based on experiential knowledge of manufacturer engineers. The PCB designs, once corrected based on the automatic correction generated by the expert system at the designing stage, may be sent to the manufacturer for manufacturing. The PCB designs corrected by the automatic correction at the designing stage may allow the manufactured PCB end products to satisfy the performance specification as specified by the PCB designers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter that can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1A:
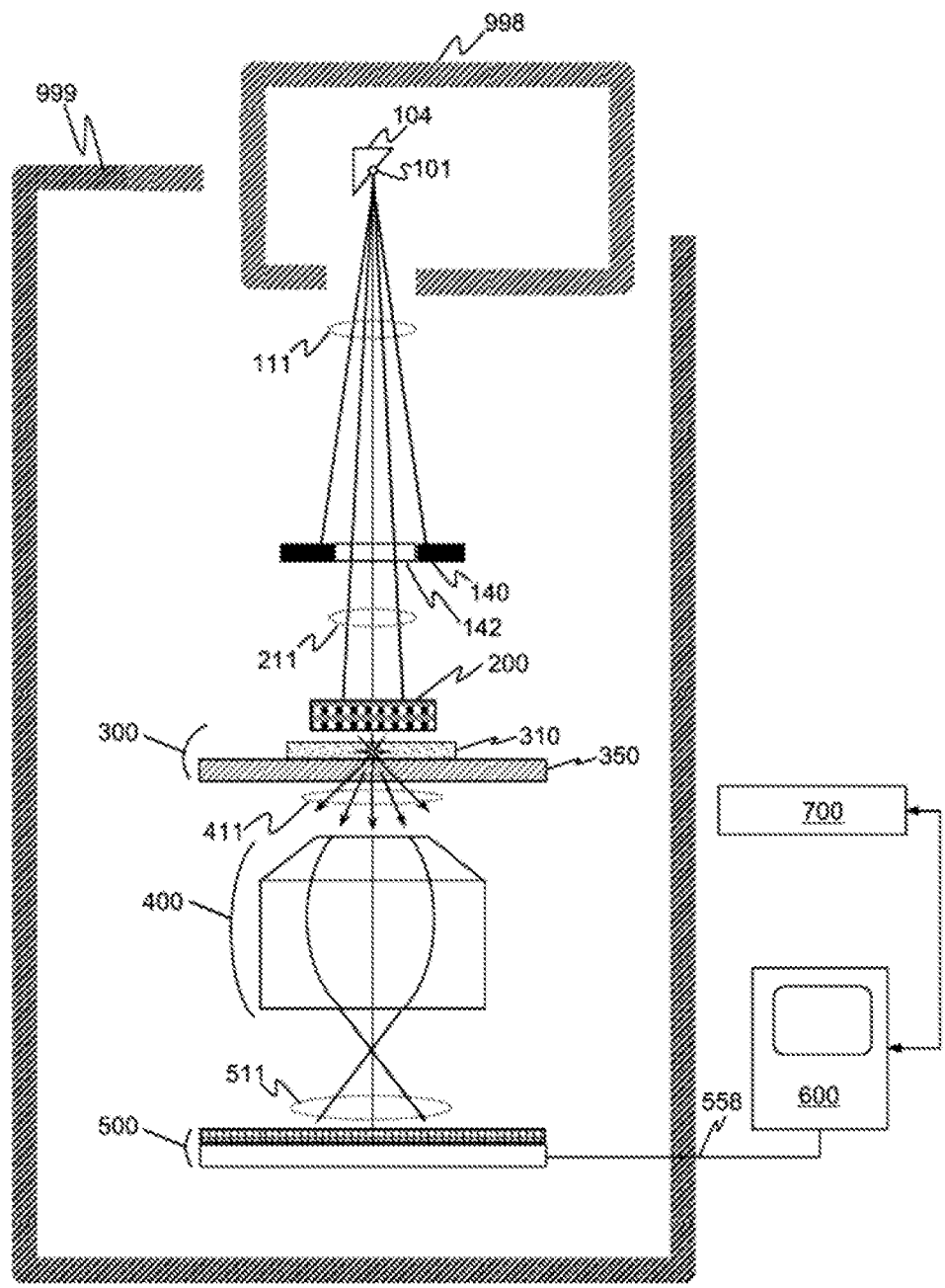
FIG. 1A illustrates an example automatic high-speed X-ray inspection system.

Note: Elements shown in the drawings are meant to illustrate the functioning of the invention and have not been drawn to scale.

DESCRIPTION OF EXAMPLE EMBODIMENTS

Automated High-Speed X-ray Inspection System
X-Ray System Framework

The system and methods disclosed herein are related to a system or the use of a system that illuminates an object to be examined or inspected with X-rays, converts X-rays to visible (or near-visible) photons, forms an image of the visible (or near-visible) photons, and then converts the image into an electronic form. As such, the various embodiments of this X-ray image formation system will be presented first, followed by the various embodiments of methods and systems that utilize the X-ray imaging system. In this disclosure, the X-ray imaging system may also be referred to as an automated high-speed X-ray inspection system or X-ray inspection system.

Although many kinds of objects can be examined or inspected using the apparatus disclosed here, it is expected to be especially suitable for the examination and inspection of integrated circuit wafers and packaging assemblies. One example of these are silicon interposers, comprising silicon with multiple TSVs, but the invention can also be used for the inspection of an integrated circuit (IC) itself, a silicon interposer, a silicon dioxide interposer, a printed circuit board (PCB) with or without ICs already installed, a 3D IC package or assembly, a 2.5D IC package or assembly, a multi-chip module (MCM), a system-in-package (SIP) and other electronic microdevices or portion thereof that comprise microscopic structures. These may be examined as incoming materials, completed products, or as partially manufactured objects at any stage of their manufacture for the purpose of metrology, process control, inspection, or yield management.

Non-electronic devices with micro- or nano-structures, such as magnetic recording media, photonic structures and photonic crystals, metamaterials, etc., can also be examined and inspected using this invention. Capacitive sensors, such as fingerprint sensors, can also be examined. A particularly attractive feature of the apparatus is that it is possible to make non-destructive, high-resolution observations and measurements of features within an object that cannot otherwise be seen using electrons or optical photons, as are used in conventional metrology and inspection tools.

In general, objects suitable for use with this invention will comprise at least one flat side. Examples include: electronic circuits on semiconductor wafers, parts of wafers or selected areas on wafers; integrated circuit chips, dice, assemblies, packages, or portions thereof; micro-fluidic devices; micro-electro-mechanical systems (MEMS), including accelerometers, gyros, magnetic and capacitive sensors and the like; photonic devices, particularly those fabricated using planar waveguides; biological tissues, including stained samples; photomasks or templates for printing or fabricating any of the above mentioned devices; and solar cells, parts thereof or parts pertaining to solar cells. Other objects without flat sides may be observed and inspected as well, but the image quality may not be uniform for objects of irregular dimensions.

In particular embodiments, the X-ray inspection system as described in this disclosure may be a high-speed X-ray inspection system. In particular embodiments, the high-speed X-ray inspection system may have a higher measurement/inspection speed than traditional X-ray systems (e.g., 100 times faster than traditional X-ray systems). As an example and not by way of limitation, the high-speed X-ray inspection system may be capable of inspecting electronic components or devices with an image collection time of approximately 33 milliseconds. In particular embodiments, the X-ray inspection system as described in this disclosure may be an automated X-ray inspection system. In particular embodiments, the automated X-ray inspection system may include one or more computers or controllers and instructions stored in one or more computer media. The automated measurement process of the automated X-ray inspection system may be controlled by the computers or controllers by executing corresponding instructions. The automated measurement process of the automated X-ray inspection system may not need interventions from human operators and may be automatically performed following particular procedures.

In particular embodiments, the X-ray inspection system as described in this disclosure may use one more artificial intelligence (AI) modules and/or machine-learning models. In particular embodiments, the artificial intelligence (AI) modules may be or include any suitable methods, processes, and/or algorithm performed by one or more computing systems. In particular embodiments, the machine-learning models may be or include, for example, but are not limited to, a rule-based algorithm, a random forest model, a neutral network or any suitable machine-learning models. In particular embodiments, the X-ray inspection system as described in this disclosure may perform real-time measurements to one or more processes performed by another system (e.g., a drilling machine, a bonding tool, an assembling tool, or any suitable tools). In particular embodiments, the term "real-time measurements" may refer to measurements performed by the X-ray inspection system in parallel to an associated process (e.g., a drilling process, an assembling process, a bonding process, or any suitable processes) without slowing down the associated process. The X-ray inspection system may perform measurements and provide feedback to the systems performing the associated process in a speed higher than or equal to the speed of the associated process.

In particular embodiments, the X-ray inspection system as described in this disclosure may perform in situ and/or inline measurements with one or more other systems or tools (e.g., a drilling machine, a bonding tool, an assembling tool, or any suitable tools). In particular embodiments, the term "in situ measurements" may refer to measurements performed by the X-ray inspection system which is integrated with other systems. For example, the X-ray inspection system may be integrated into a drilling machine and perform in situ measurements to monitor the drilling process of the drilling machine. The in situ measurements may be automatically controlled by one or more computing systems coordinating the X-ray inspection system and the drilling machine. In particular embodiments, the term "inline measurements" may refer to measurements performed by the X-ray inspection system within the same process (e.g., a drilling process, an assembling process, a bonding process, or any suitable processes) performed by another system (e.g., a drilling machine, a bonding tool, an assembling tool, or any suitable tools). For example, during an assembling process performed by an assembling tool, the X-ray system may inspect the assembled components or devices during one or more steps of the assembling process. The components or devices may be automatically transferred from the assembling tool to the X-ray inspection system (e.g., by a robot arm) or may be manually transferred from the assembling tool to the X-ray inspection system (e.g., by a human operator). The X-ray inspection system may provide feedback information automatically to the assembling tool or to a human operator.

X-Ray Imaging System

FIG. 1A illustrates an example automatic high-speed X-ray inspection system 1000A. An X-ray emitter 101 emits X-rays 111. These X-rays are then shaped into a collimated X-ray beam 211, in some embodiments using distance from the emitter 101 and a plate 140 with an aperture 142. This collimated X-ray beam 211 then illuminates an object 200 to be examined. The X-rays that are transmitted through the object 200 illuminate a scintillator assembly 300 comprising a scintillator 310 and, in some embodiments, a support 350 for the scintillator. The scintillator 310 absorbs a portion of the X-rays and releases some of the energy so absorbed with the emission of visible photons 411.

Using an optical system 400, a magnified image 511 of the visible photons 411 emitted by the scintillator is formed on an image detector 500. The image detector 500 converts the intensity of the magnified image 511 to an electronic signal. The image detector 500 can comprise an electronic sensor, such as a charge-coupled device (CCD), or another image sensor known to those skilled in the art. The electronic signal is transmitted to a system of electronics 600 that, in some embodiments can display the image results, and in some embodiments can store the image results and/or perform image processing algorithms on the image results in conjunction with a computer system 700.

For any source emitting ionizing radiation such as X-rays, it is often wise to provide shielding 998 around the X-ray source 100, and in some situations legally required for operation. Such shielding 998 can be a simple enclosure of shaped sheets of lead metal, or a more intricate design fabricated from any of a number of X-ray absorbing materials, such as lead-doped glass or plastic, that will be known to those skilled in the art. Shielding is desirable to keep random X-rays, either directly from the emitter 101 or reflected from some other surface, from causing unwanted effects, particularly spurious signals in the various electronic components used to control the system.

Likewise, for some embodiments, additional shielding 999 around the beam path may also be desired, and in some cases be legally required for operation. Such additional shielding 999 can be a simple enclosure of shaped sheets of lead metal, or a more intricate design fabricated from any of a number of X-ray absorbing materials such as lead-doped glass or plastic, that will be known to those skilled in the art. Additional shielding 999 is desirable to keep random X-rays, either directly from the emitter 101 or reflected from some other surface, from causing unwanted effects, particularly spurious signals in the various electronic components used to control the system.

Because certain image detectors 500 such as those comprising CCD sensors can be particularly sensitive to X-ray exposure, in some embodiments a portion of the scintillator assembly 300 can also be fabricated in whole or in part using a material, such as a lead-doped glass, which absorbs X-rays while transmitting the visible photons 411 emitted by the scintillator.

Figure 1B:
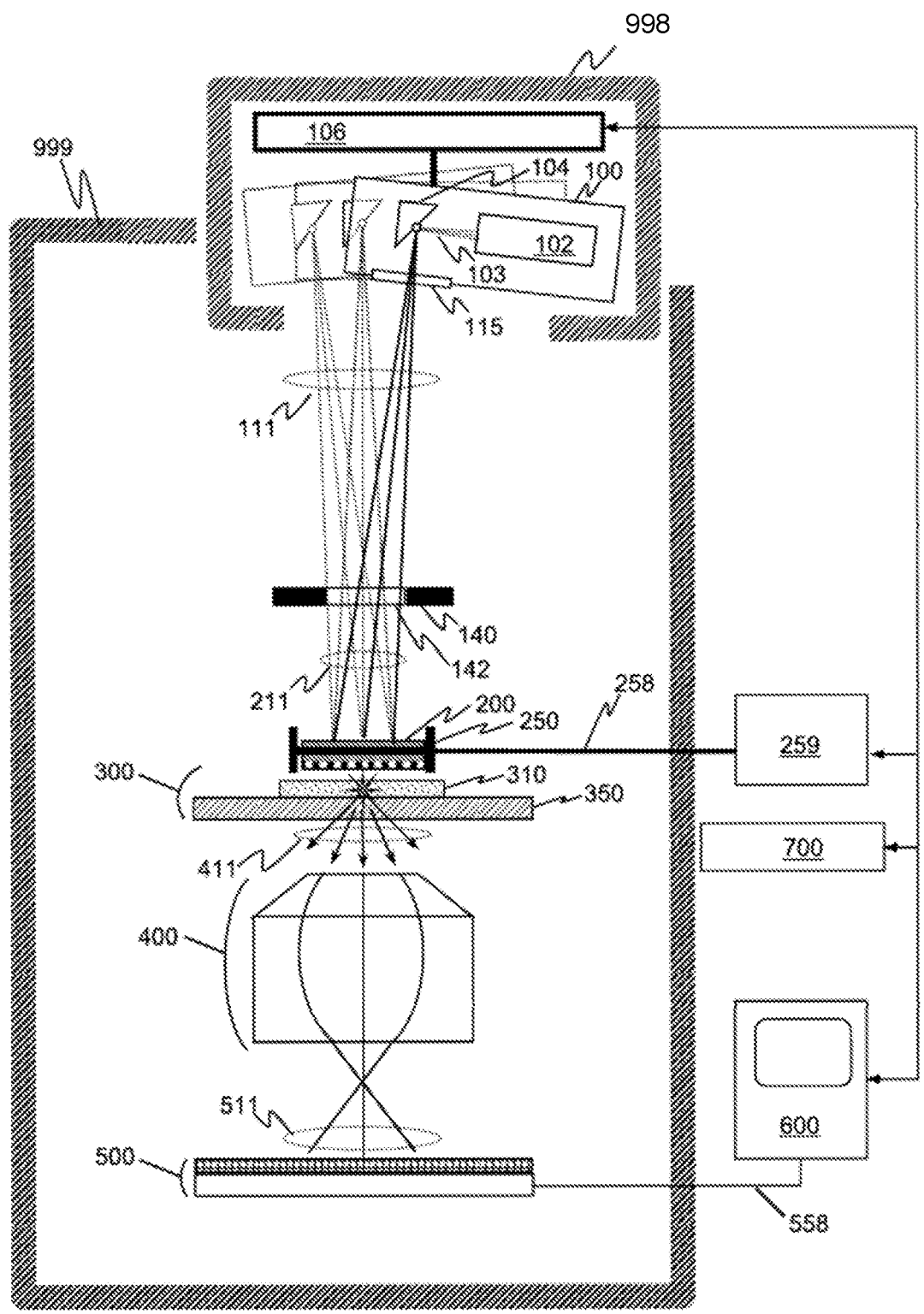
FIG. 1B illustrates an example X-ray inspection system with movable X-ray source with respect to the inspected object for generating X-ray images at different directions.

FIG. 1B illustrates an example X-ray inspection system 1000B with movable X-ray source with respect to the inspected object for generating X-ray images at different directions. As an example and not by way of limitation, the X-ray system may include a mount 106 that can move the position of the X-ray source 100 relative to the object 200, thereby changing the angle of incidence of the X-ray beam on the object. The mount 106 can be designed to allow the X-ray source 100 to swing in the x-z plane, in the y-z plane, or any other combination of axes. The source can also be moved along the z-axis to move the X-ray source 100 closer to the object 200. This may have the effect of making the beam brighter, increasing signal strength, at the cost of having an X-ray beam that is less collimated, reducing resolution. This effect may be reduced or eliminated by reducing the spot size of the X-ray source.

Motion of the X-ray source 100 using the mount 106 can be controlled by the computer system 700 several ways. In some embodiments, the source mount 106 may move the X-ray source 100 to a fixed location to allow an image to be captured. In some embodiments, the mount 106 can move the X-ray source 100 continuously as images are gathered, allowing the dynamic change of X-ray intensity as transmitted through the object 200 to be recorded as a function of illumination angle. In some embodiments, the X-ray emitter 101 can be moved to at least 10 degrees off the normal incidence angle. In some embodiments, further adjustment of the angle of incidence of the X-ray beam 211 on the object 200 can be achieved by coordinating the motion of the X-ray source 100 using the source mount 106 with the motion of the object 200 using the object mount 250. This coordination can be done manually or using the computer system 700. In some embodiments, the shielding 998 will be designed to enclose the X-ray source 100 and the source mount 106. In other embodiments, the shielding 998 can be designed to only enclose the X-ray source, with the mount 106 designed to move the shielding 998 as it moves the X-ray source 100. In some embodiments of the invention, multiple X-ray sources may be used to produce images with different angles of incidence. The X-ray sources may be fixed in space or moveable and may be operated sequentially or simultaneously. They can be operated manually or controlled by one or more computer systems 700.

In particular embodiments, the X-ray imaging system described in this disclosure may be an automated high-speed and high-resolution X-ray imaging system for generating X-ray images of electronic devices. In particular embodiments, the automated high-speed X-ray inspection system may include X-ray detectors having a high sensitivity for X-ray radiation and a large number of grayscale levels (e.g., 10,000+ grayscale levels) with a large dynamic range. In particular embodiments, the X-ray system may include one or more high-resolution X-ray detectors for generating high-resolution X-ray images during the X-ray inspection process. In particular embodiments, the high-resolution X-ray detectors may include a large number of pixels (e.g., 12+ megapixels, 29+ megapixels). In particular embodiments, the system with the high-resolution X-ray detectors may have a spatial resolution of lower than 2 µm, a field of view of 12 mm×12 mm, and a throughput greater than or equal to 3000 mm$^2$ per minute. In particular embodiments, the system with the high-resolution X-ray detectors may have a spatial resolution smaller than 0.5 microns, a field of view of at least 12 mm×12 mm. In particular embodiments, the samples may be inspected with a speed or throughput no less than 300 mm$^2$ per minute. In particular embodiments, the system may generate X-ray images with a frame rate of at least 30 FPS. An X-ray image may be generated in a time period that is equal to or less than 33 milli seconds. More details about the X-ray system may be found in U.S. patent application Ser. No. 15/470,726, filed 27 Mar. 2017, which is incorporated herein by reference.

Overview

Problems being Solved

Existing PCB design tools allow PCB designers to design PCBs by specifying target performance parameters (e.g., transmission line parameters). When a PCB design is sent to manufacturer for manufacturing, the PCB design may be tweaked or modified by manufacturer engineers to achieve the target performance parameters as specified by the designer. The modifications may be performed manually by the manufacturer engineers based on the experiential knowledge of the manufacturer engineers. However, the modifications to the PCB design by the manufacturer engineers and other factors in the manufacturing process (e.g., equipment drifting or errors) may render the PCB end product that is manufactured to be different from what is intended by the designer. The manufactured PCB may be tested electrically to determine whether the PCB product is within acceptable ranges (e.g., with respect to the performance specification set by the designer) and whether the PCB works appropriated at intended by the designer. The PCB designers may adjust the PCB designs based on the electrical testing result and re-send the adjusted PCB designs to manufacturer to repeat the whole process. This PCB designing and manufacturing process may go back-and-forth for many iterations and could be time and resource consuming.

Solution Summary

In particular embodiments, an expert system may be used to analyze PCB design and generate automatic corrections for the analyzed PCB designs at the designing stage before the PCB designs are sent to manufacturers. The expert system may include a machine-learning (ML) model or/and a rule-based algorithm to generate automatic corrections for PCB designs. The system may use an X-ray inspection system to inspect a number of PCB products to measure the metrology information of these inspected PCB products and store the X-ray inspection data (e.g., X-ray images and metrology information) in a database. Then, the system may use the X-ray inspection data and corresponding PCB designs to train the ML model on how to tweak or modify the PCB designs to achieve the target performance as specified by the designers. The system may include a rule-based algorithm including a number of rules that are generated based on experiential knowledge of the manufacturer engineers for tweaking or modifying PCB designs to achieve the target performance as intended by the designers. At run time, the system may generate corrections or modifications for PCB designs at the designing stage based on ML model inference or using the PCB correcting rules generated based on experiential knowledge of manufacturer engineers. The PCB designs, once corrected based on the automatic correction generated by the expert system at the designing stage, may be sent to the manufacturer for manufacturing and may allow the manufactured PCB end products to satisfy the performance specification as set by the PCB designers.

Benefits and Advantages

By inspecting the manufactured PCBs using X-ray and comparing the actual PCBs to corresponding PCB designs, particular embodiments of the system may identify the reasons why the manufactured PCB products are different from the PCB designs. By identifying the exact reasons that cause the PCB products to be different from specification, particular embodiments of the system may generate corrections that are more specific, more accurate and effective to eliminate these differences. By correcting PCB designs at the designing stage, particular embodiments of the system may significantly increase the PCB designing and manufacturing speed and reduce the resource waste related to designing and manufacturing PCBs by eliminating the back-and-forth process between the designers and the manufacturers. By correcting PCB designs at the designing stage, particular embodiment of the system may allow the manufactured PCB products to satisfy the PCB performance specification as intended by the designer. By correcting PCB designs based on ML model inference or experiential knowledge of manufacturer engineers, particular embodiments of the system may allow manufactured PCB products to have a lower defect rate and a higher manufacturing quality.

Existing PCB Design and Manufacturing Process

Figure 2A:
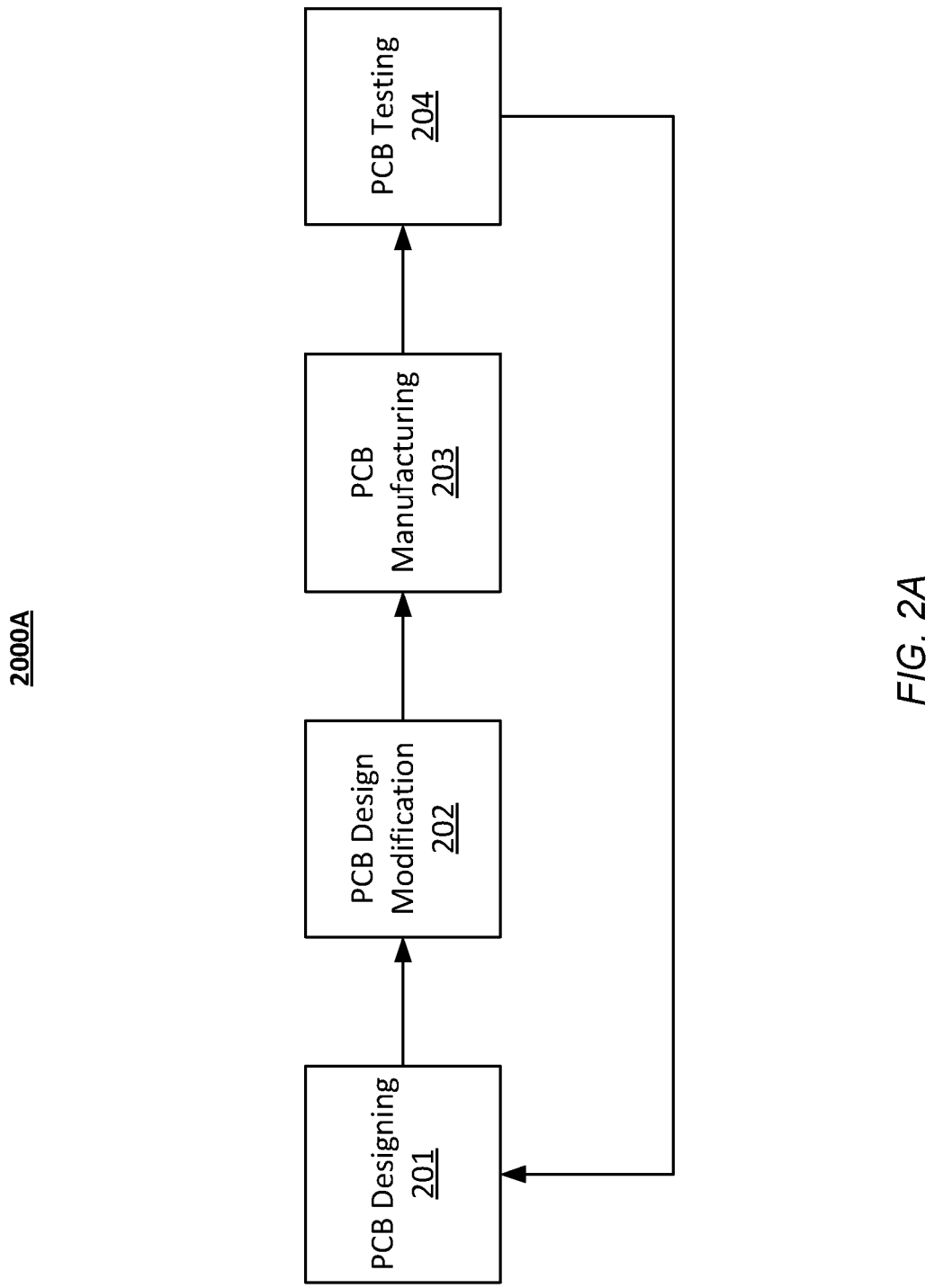
FIG. 2A illustrates an example existing process for designing and manufacturing printed circuit boards (PCBs).

FIG. 2A illustrates an example existing process 2000A for designing and manufacturing printed circuit boards (PCBs). Existing PCB designing and manufacturing techniques may need multiple steps including PCB designing 201, PCB design modification 202, PCB manufacturing 203, and PCB testing 204. For example, PCB designers may generate PCB designs based on their knowledge and best judgements and may specific certain performance parameters (e.g., transmission line parameters) as target performance parameters for the designed PCBs. Then, the PCB designers may send the PCB designs to a PCB manufacturer. The manufacturer engineers, after received the PCB design, may analyze each PCB design and make some modifications to the PCB design to achieve the target performance parameters as specified by the designers. The modification may be determined based on experiential knowledge on how the PCB manufacturing equipment works and what the end products would be for particular PCB designs. Then, the PCB manufacturer may manufacture some sample PCB products based on the modified PCB designs. After that, the manufactured PCB samples may be tested electrically (by the PCB designers or the PCB manufactures) to check whether the PCB works appropriately as intended by the PCB designers. In many cases, the modifications to the PCB design by the manufacturer engineers or/and other influence factors in the manufacturing process (e.g., manufacture equipment variations or drifting errors) may cause the PCB end products to be different from what is intended by the designer. For example, the manufactured PCB products may have different performance parameters as specified by the PCB designer, and therefore may not work appropriately as intended by the PCB designer. In these cases, the PCB designers may need to re-generate the PCB designs based on feedback information from the manufacturer engineers and the electrical testing results and re-send the new PCB designs to the manufacturer to repeat the above processes. The process including PCB designing 201, PCB design modification 202, PCB manufacturing, and PCB testing could go back and forth for many iterations and could be time and resource consuming. Furthermore, the modifications to the PCB designs may be different if they are made by engineers of different manufacturers.

Expert System for PCB Design Automatic Corrections

Framework for PCB Design with Automatic Correction

Figure 2B:
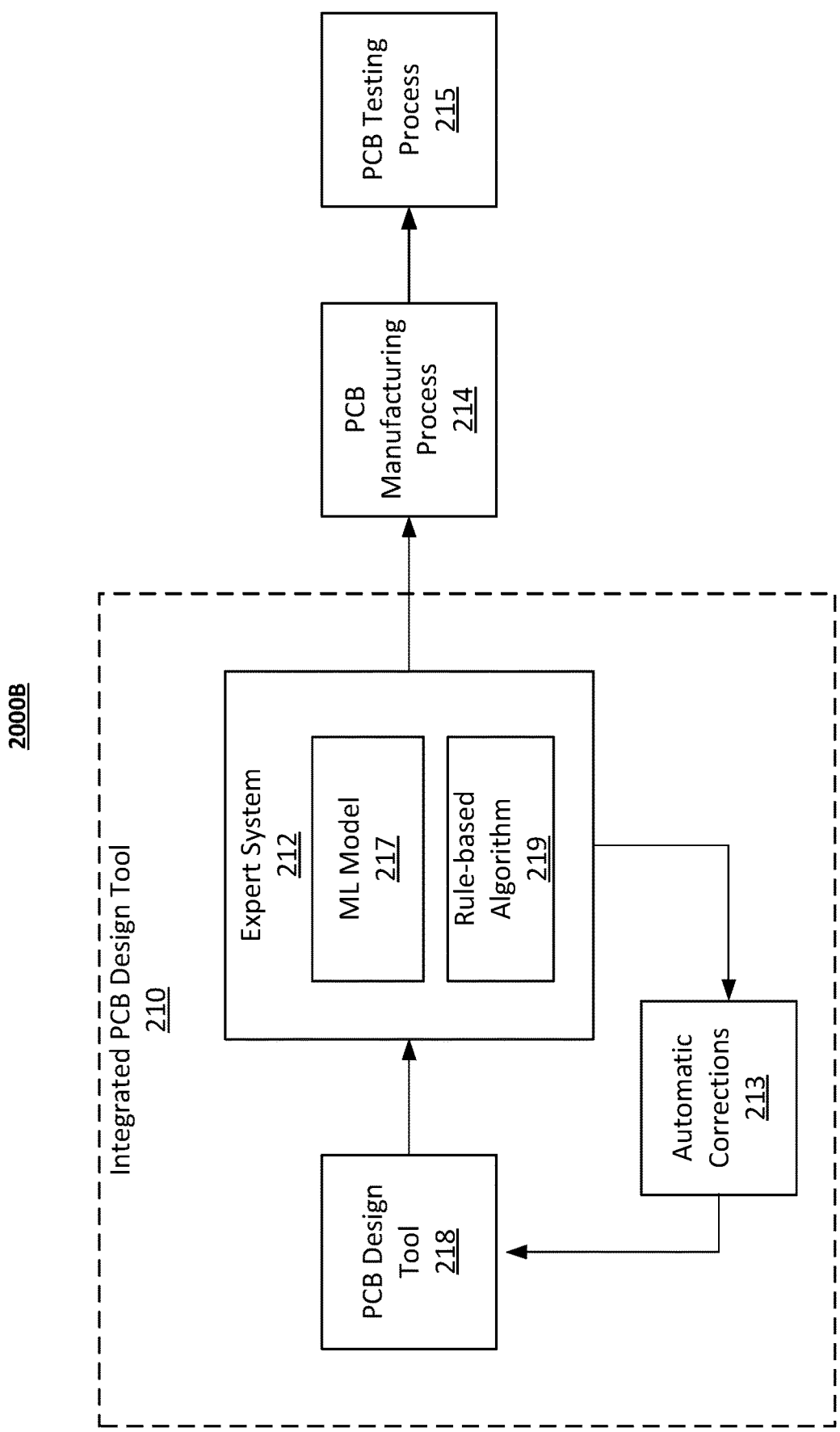
FIG. 2B illustrates an example framework for designing and manufacturing printed circuit boards (PCBs) based on automatic corrections at the PCB designing stage.

FIG. 2B illustrates an example framework 2000B for designing and manufacturing printed circuit boards (PCBs) based on automatic corrections at the PCB designing stage. In particular embodiments, the framework 2000B may include a PCB design tool 218 and an expert system including one or more machine-learning models 217 or/and one or more rule-based algorithms 219. In particular embodiments, the PCB design tool 218 and the expert system 212 may be integrated into an integrated PCB design tool 210. In particular embodiments, the PCB design tool 218 and the expert system 212 may be separate systems or software working coordinately with each other. The PCB designers may use the PCB design tool 218 to generate PCB designs by creating the PCB design schematic diagrams, defining PCB layouts (e.g., locations and directions of conductive traces)

and dimensions (e.g., trace width, length, thickness), and specifying PCB performance parameters (e.g., transmission line parameters, capacitance values, inductance values, resistance values, operating frequency ranges, signal voltage and current levels, etc.). After the PCB designs are generated and before the PCB designs are sent to PCB manufacturers for manufacturing (e.g., 214), the system may send the generated PCB designs to the expert system 212 for analysis. The expert system 212 may use the ML model 217 or/and a rule-based algorithm 219 to automatically analyze the PCB designs and generate one or more automatic corrections 213 (or may be referred as modifications) to the PCB designs. The corrections or modifications 213 to the PCB designs may be generated based on the ML model inference results or/and one or more rules for correcting PCB designs. The ML model 217 may be previously trained to identify correlations between the PCB designs and the corresponding PCB end products generate the corrections based on the identified correlations. The rules in the rule-based algorithm 219 may be generated or/and updated based on experiential knowledge of the manufacturer engineers and may be used to generate PCB corrections that modify the PCB designs in the manners that are similar or the same to the manufacturer engineers. In particular embodiments, the system may automatically correct or modify the PCB designs based on the automatic correction 213 at the designing stage before the PCB designs are sent to manufacturers. In particular embodiments, the system may send one or more correction recommendations to the PCB designers or the users of the expert system based on the automatic corrections generated by the expert system 212 to allow the PCB designers or the users of the expert system to modify the PCB designs at the designing stage based on the correction recommendations. The PCB designs, once corrected at the designing stage, may be sent to the PCB manufactures for the manufacturing process 214. The corrected PCB designs may allow the PCB end products to satisfy the performance specification as specified by the PCB designers. The manufactured PCB products may be tested in the PCB testing process 215 before shipping to customers.

ML Model Training Based on Human Knowledge

Figure 3A:
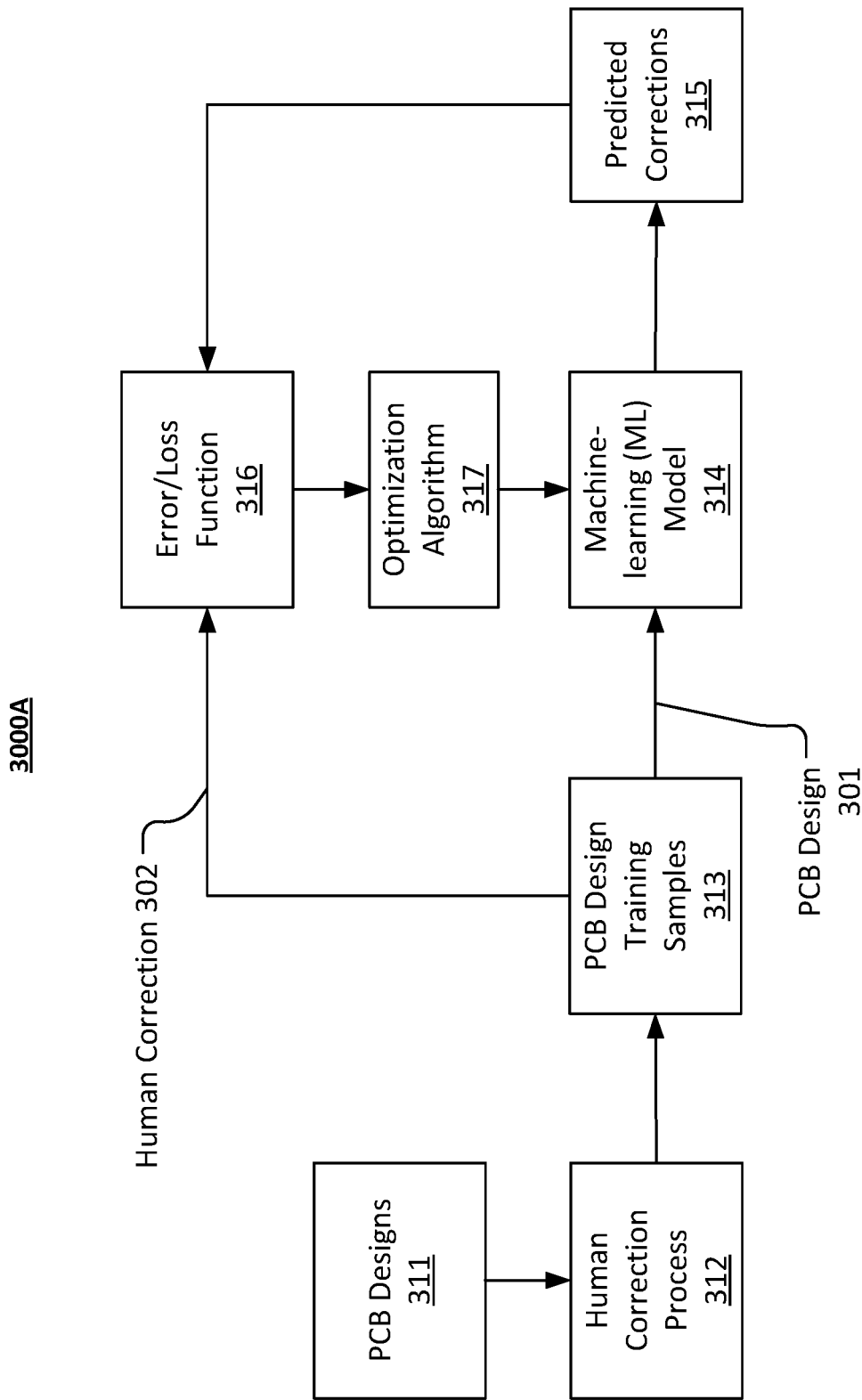
FIG. 3A illustrates an example process for training a machine-learning (ML) model using PCB training samples generated using a human correction process.

FIG. 3A illustrates an example process 3000A for training a machine-learning (ML) model using PCB training samples generated using a human correction process. In particular embodiments, the expert system (e.g., 212 in FIG. 2B) for correcting PCB designs may include an artificial intelligence (AI) algorithm or/and a machine learning (ML) model for generating automatic corrections for PCB designs. The expert system may analyze the PCB designs using the AI algorithm and the ML model and automatically generate corrections to the design based the analyzing results of the AI algorithm and ML model. As an example and not by way of limitation the expert system may include one or more ML models to capture the experiential knowledge (or any related knowledge) of the manufacturer engineers and generate the automatic corrections based on the experiential knowledge captured in the ML models. To generate the PCB design training samples 313, a number of PCB designs 311 may be corrected by manufacturer engineers based on their experiential knowledges during a human correction process 312. In particular embodiments, the PCB design training samples 313 may be previously corrected PCB designs by the manufacturer engineers for PCB manufacturing purpose. The PCB design training samples 313 may include the PCB designs 301 and the corresponding human corrections 302 for these PCB designs. During a training process, the system may feed the PCB designs 301 to the ML model 314 which may output the corresponding predicted correction 315 based on current ML model parameters (e.g., weight values). Then, the system may send the human correction 302 corresponding to the input PCB design 301 and the predicted correction 315 corresponding to the same input PCB design 301 to the error/loss function 316. The error/loss function 316 may compare the predicted correction 315 to the corresponding human correction 302 and determine the difference between the predicted correction 315 and the human correction 316. The error/loss function 316 may send the comparison results to an optimization algorithm 317 (e.g., a gradient descent algorithm). The optimization algorithm 317 may use a mathematical optimization process to determine ML model parameters that could minimize the difference of the predicted correction 315 and the corresponding human correction 302 as determined by the error/loss function 316. The optimization algorithm 317 may send the optimization result to the ML model 314 which may adjust corresponding parameters (e.g., weights) accordingly. The ML model 314 with the adjusted parameters (e.g., weights) may output subsequent predicted corrections that are closer to the human correction made by the manufacturer engineers. The training process of the ML model 314 may be repeated until the predicted corrections 315 by the ML model 314 match the corresponding human corrections (e.g., being within a pre-determined similarity range). As a result, the ML model 314, which is trained by the training samples generated by the human correction process, may capture the knowledge of the manufacturer engineers (e.g., experiential knowledge, theoretical knowledge, or any related knowledge) and generate automatic corrections that can correct or modify PCB designs in a manner that similar or the same to corrections made by the manufacturer engineers.

Experiential Knowledge and PCB Metrology Information

In particular embodiments, the expert system (e.g., 212 in FIG. 2B) may generate automatic corrections for PCB designs based on human knowledge (e.g., experiential knowledge or/and theoretical knowledge of manufacturer engineers) captured in the ML model 217 or/and the rule-based algorithm 219. For example, the system may use PCB designs that are corrected by manufacturer engineers based on their knowledge as the training samples to train the ML models or to generate correction rules for PCB designs. The knowledge of the manufacturer engineers may include knowledge related to the how the PCB end products would be different from the intentions of the PCB designers for particular PCB designs. However, without the actual metrology information of the actual PCB products (e.g., layer thickness and distance, trace dimensions), the manufacturer engineers may not have a clear understand on why the PCB end products are different from the what is intended by the PCB designers for particular PCB designs. For example, when a PCB product does not work appropriately as intended by the PCB designer, the manufacturer engineers may identify (e.g., using electrical testing) a problematic capacitor in the PCB product having a capacitance that does not satisfy specification requirements but may not be clear why this capacitance is off range. To determine the underneath reasons why that capacitance is off range, the manufacturer engineer may need to know the actual metrology information of the PCB product (e.g., actual physical layout of traces of the PCB).

In particular embodiments, the X-ray inspection system may inspect a number of manufactured PCB samples or PCB products to measure the metrology information of these PCBs. By measuring the metrology information of the PCB products based on the X-ray inspection data, the system may determine not only how the PCB products would be different from what is intended by the designers but also the root causes why the PCB products are different from what is intended by the designers. In particular embodiments, the system may correct PCB designs based on the X-ray inspection data (e.g., PCB metrology information) and generate PCB design training samples to train the ML model (or to generate the PCB correction rules). The expert system having the ML model trained based on the X-ray inspection data (or the PCB correction rules generated based on the X-ray inspection data) may generate PCB corrections that are more specific and accurate PCB design corrections than the corrections generated based only on experiential knowledge, and therefore can correct the PCB designs more effectively and thoroughly. For example, when a PCB product does not work appropriately as intended by the PCB designer because of a problematic capacitor having a capacitance that is off range. The system may compare the PCB metrology information as determined based on X-ray inspection to the corresponding PCB design to uncover the underneath reasons that cause the capacitance to be off range (e.g., an electric trace related to this capacitor having a width beyond a pre-determined requirement range).

ML Model Training Based on X-Ray Inspection Data

Figure 3B:
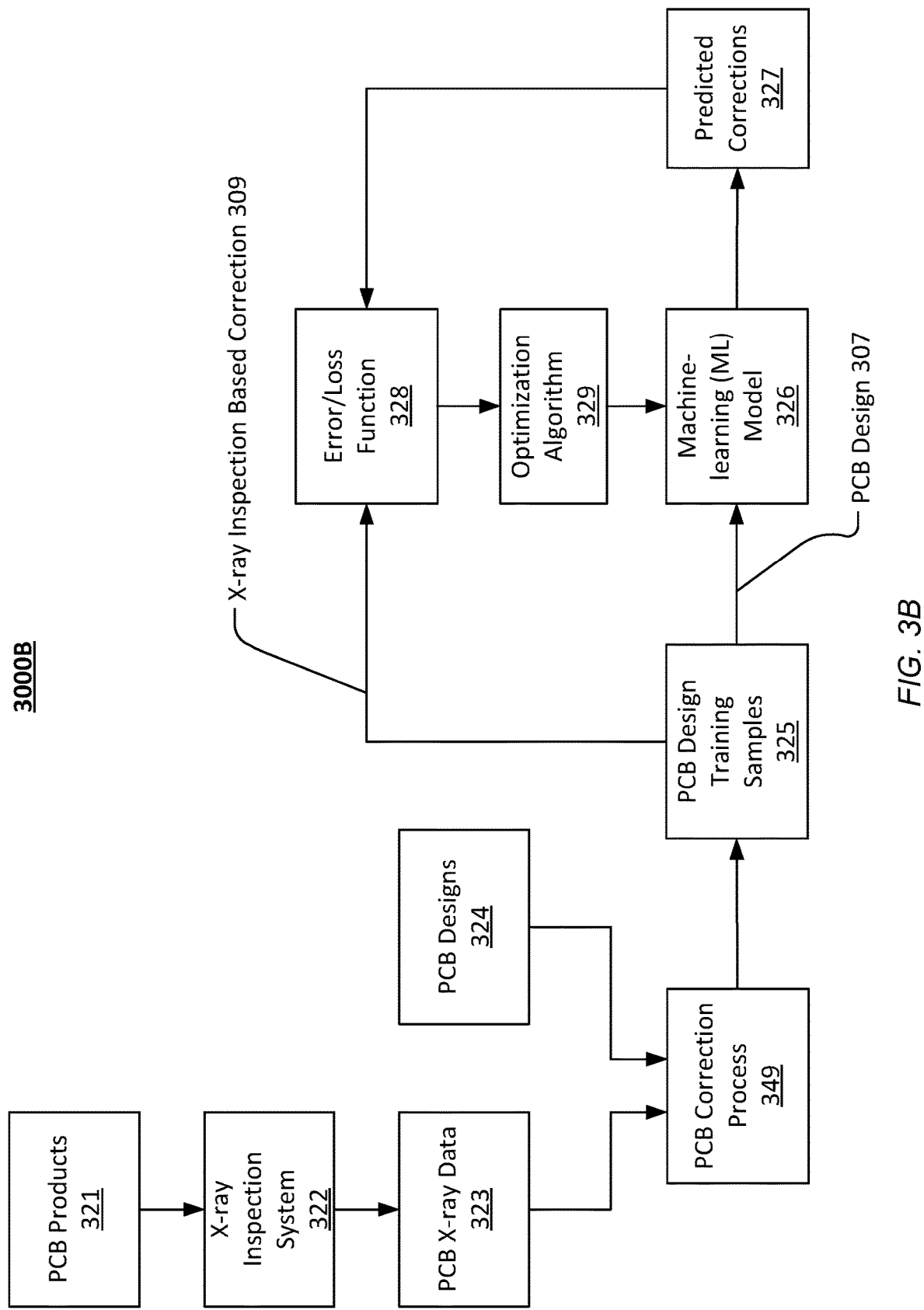
FIG. 3B illustrates an example process for training a machine-learning (ML) model using PCB training samples generated based on X-ray inspection data.

FIG. 3B illustrates an example process 3000B for training a machine-learning (ML) model using PCB training samples generated based on X-ray inspection data. In particular embodiments, the expert system (e.g., 212 in FIG. 2B) for generating automatic corrections (or modifications) for PCB designs may include one or more ML models. The ML models may be trained using training samples that are generated based on X-ray inspection data. As an example and not by way of limitation, the X-ray inspection system 322 may inspect a number of PCB products 321 to determine metrology information (e.g., dimensions) of the PCB products and store the X-ray inspect data (e.g., X-ray images, metrology information) in a database. The PCB X-ray inspection data 323 and the corresponding PCB designs may be processed during a PCB correction process 349 (e.g., by a PCB correction algorithm or a human engineer) to generate the PCB design training samples 325. The PCB design training samples 325 may include a number of PCB designs and corresponding corrections that are generated based on the X-ray inspection data. During the training process of the ML model 326, the system may feed a PCB design 307 to the ML model 326 which may output the corresponding predicted correction 327 based on the current ML model parameters (e.g., weights). The system may send the X-ray inspection based correction 309 and the predicted correction 327 corresponding to the same PCB design to the error/loss function 328. The error/loss function 328 may compare the predicted correction 327 to the corresponding X-ray inspection based correction 309 and determine the difference between the predicted correction 327 and the X-ray inspection based correction 309. The error/loss function 328 may send the comparison results to an optimization algorithm 329 (e.g., a gradient descent algorithm). The optimization algorithm 329 may use a mathematical optimization process to adjust ML model parameters to minimize the difference of the predicted correction 327 and the corresponding X-ray inspection based correction 309 as determined by the error/loss function 328. The optimization algorithm 329 may send the optimization result to the ML model 326 which may adjust the corresponding parameters (e.g., weights) accordingly. The ML model 326 with the adjusted parameters (e.g., weights) may output subsequent predicted corrections that are closer to the X-ray inspection based corrections 309. The training process of the ML model 326 may be repeated until the predicted corrections 327 output by the ML models match the corresponding corrections based on the X-ray inspection data (e.g., being within a pre-determined similarity range).

ML Model Training Based on X-Ray Inspection Data and Human Knowledge

Figure 3C:
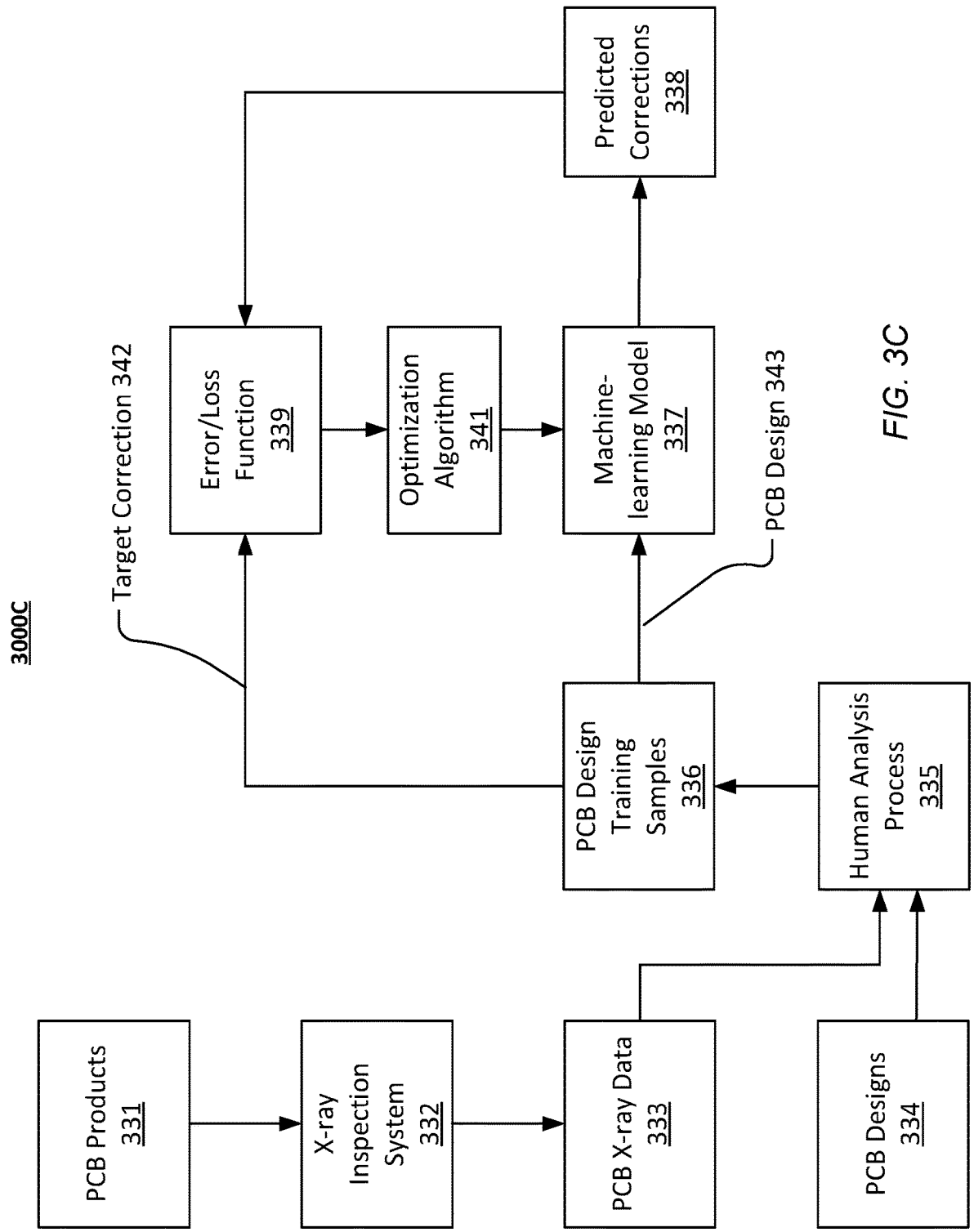
FIG. 3C illustrates an example process for training a machine-learning (ML) model using PCB training samples generated based on X-ray inspection data and human knowledge.

FIG. 3C illustrates an example process 3000C for training a machine-learning (ML) model using PCB training samples generated based on X-ray inspection data and human knowledge. In particular embodiments, the expert system (e.g., 212 in FIG. 2B) for generating automatic corrections or modifications for PCB designs may include one or more ML models for generating the automatic corrections for PCB designs. The ML models may be trained using training samples that are generated based on both X-ray inspection data and human knowledge (e.g., experiential knowledge of manufacturer engineers). As an example and not by way of limitation, the X-ray inspection system 332 may inspect a number of PCB products 331 to determine metrology information (e.g., dimensions) of the PCB products and store the X-ray inspect data 333 (e.g., X-ray images, metrology information) in a database. The PCB designs 334 corresponding to the inspected PCB products 331 may be analyzed by manufacturer engineers during a human analysis process 335. The PCB design training samples 336 may be generated based on (1) the human analysis results by human engineers based on their experiential knowledge and (2) the X-ray inspection data 333 stored in the database. As an example and not by way of limitation, the PCB designs may be firstly corrected by manufacturer engineers during the human analysis process 335. The human corrections generated by the manufacturer engineers may be further adjusted or modified (e.g., by a correction algorithm or human engineers) based on the PCB metrology information determined based on X-ray inspection data to generate the PCB design training samples 336. As another example, the PCB designs may be firstly corrected by a correction algorithm based on the X-ray inspection data. Then, the corrections generated based on the X-ray inspection data may be further adjusted by human engineers based on experiential knowledge to generate the PCB design training samples 336.

In particular embodiments, the PCB design training samples 336 may include a number of PCB designs with corresponding target corrections that are generated based on both X-ray inspection data and experiential knowledge of human engineers. During the training process for the ML model 337, the system may feed the PCB design 343 to the ML model 337 which may output the corresponding predicted correction 338 based on the current ML model parameters (e.g., weights). The system may send the target corrections 342 and the predicted correction 338 corresponding to the same PCB design to the error/loss function 339. The error/loss function 339 may compare the predicted correction 338 to the corresponding target correction 342 and determine the difference between the predicted correction 338 and the corresponding target correction 342. The error/loss function 339 may send the comparison results to an optimization algorithm 341 (e.g., a gradient descent algorithm). The optimization algorithm 341 may use a mathematical optimization process to find ML model parameters that could minimize the difference of the predicted correction 338 and the corresponding target correction 342 as determined by the error/loss function 339. The optimization algorithm 341 may send the optimization result to the ML model 337 which may adjust the corresponding ML model parameters (e.g., weights) accordingly. The ML model 337 with the adjusted parameters (e.g., weights) may output subsequent predicted corrections that are more like the target correction 342. The training process of the ML model 337 may be repeated until the predicted corrections 338 by the ML models match the corresponding target corrections (e.g., being within a pre-determined similarity range).

Rule Based Algorithms

In particular embodiments, the expert system (e.g., 212 in FIG. 2B) may include a rule-based algorithm (e.g., 219) for generating PCB design corrections. The rule-based algorithm may include a number of PCB correction rules generated based on knowledge (e.g., experiential knowledge, theoretical knowledge, or any related knowledge related to PCB designing and the manufacturing process) of human engineers or/and PCB metrology information determined based on X-ray inspection data. In particular embodiments, some of the PCB correction rules may be related to one or more PCB parameters including, for example, but not limited to, a signal transmission speed, a data transmission rate, a number of layers, a PCB layout, a design pattern of conductive traces, a layer thickness, a layer thickness variation trend, an impedance, an impedance variation, etc. In particular embodiments, the automatic corrections for PCB designs may be generated based at least in part on one or more PCB correction rules of the rule-based algorithm. In particular embodiments, the automatic correction for PCB designs may be generated based on a combination of one or more PCB correction rules and ML model reference results. In particular embodiments, the PCB correction rules may be determined by human engineers (e.g., manufacturer engineers, expert system engineers, users of the expert system, users of the PCB design tool) and may be updated by the human engineers (e.g., manufacturer engineers, expert system engineers and users, PCB design tool users) based on subsequently obtained knowledge (e.g., new experiential knowledge, new X-ray inspection data, new theoretical knowledge). In particular embodiments, one or more PCB correction rules of the expert system may be generated by an artificial intelligence (AI) algorithm or/and a machine learning (ML) model based on human corrected PCB design training samples. In particular embodiments, one or more PCB correction rules of the expert system may be generated by an artificial intelligence (AI) algorithm or/and a machine learning (ML) model based on PCB design correction samples generated based on X-ray inspection data. In particular embodiments, one or more PCB correction rules of the expert system may be updated (e.g., adding new rules or modifying existing rules) by the artificial intelligence (AI) algorithm or the machine learning (ML) model based on subsequently obtained information (e.g., new PCB design corrected by human engineers, new X-ray inspection data). In particular embodiments, one or more PCB correction rules of the expert system may be updated (e.g., adding new rules or modifying existing rules) by the artificial intelligence (AI) algorithm or the machine learning (ML) model using deep-learning based on new learning data or training data. In particular embodiments, the PCB correction rules of the expert system may be updated (e.g., adding new rules or modifying existing rules) based on the feedback information from users of the expert system or PCB metrology information determined based on subsequent X-ray inspection data.

ML Models or Rule-Based Algorithms Individualized Per Manufacturer

In particular embodiments, the expert system may include one or more ML models or/and rule-based algorithms that are customized based on one or more related characteristics, features, or attributes (e.g., manufacturers, PCB types, manufacturer equipment, PCB operation frequency ranges, number of layers, application types, etc.). As an example and not by way of limitation, each manufacturer may have different manufacturing equipment with different parameter variations and therefore, may have different requirements on how to tweak PCB designs to achieve the target performance parameters as specified by the PCB designers. The expert system may include one or more ML models that are trained using training samples generated based on the knowledge of the manufacturer engineers of that particular manufacturer or the PCB inspection data of PCB products from that particular manufacturer. The rule-based algorithm may include one or more rules that are generated based on the knowledge of manufacturer engineers of that particular manufacturer. As another example and not by way of limitation, each PCB type (e.g., PCBs for high frequency applications, PCBs for low frequency applications, multi-layer PCBs, single-layer PCBs) may have different requirements on how the PCB should be designed or modified to achieve the target performance parameters. The expert system may include one or more ML models that are trained using training samples of that particular PCB type. The rule-based algorithm may include one or more rules that are generated based on the design requirements of that particular PCB type.

X-Ray Inspection and PCB Metrology

X-Ray Inspection on PCBs

In particular embodiments, an X-ray inspection system may be used to inspect PCB samples or products and measure the corresponding PCB metrology information based on the X-ray images generated by the X-ray inspection system. In particular embodiments, the X-ray inspection system may inspect each PCB product that are manufactured based on a particular PCB design to verify the manufactured PCBs meet the specification as set by the PCB designers. In particular embodiments, the X-ray inspection system may inspect each PCB product that are manufactured by a particular manufacturer based on a particular PCB design. In particular embodiments, the X-ray inspection system may inspect each PCB product that are among a same product batch manufactured by a particular manufacturer based on a particular PCB design. In particular embodiments, the X-ray inspection system may inspect representative PCB samples that are selected from the manufactured PCBs (e.g., 1 per 10 PCBs, 1 per 100 PCBs, 1 per 1000 PCBs, etc.). In particular embodiments, the X-ray inspection system may inspect PCB samples or products of particular categories (e.g., PCBs that failed during electrical testing, PCBs that passed the electrical testing, PCBs that are not stable during electrical testing). The system may generate a number of X-ray images for the inspected PCBs and may determine the metrology information (e.g., layer thickness, layer distances, conductive trace dimensions including length, width, thickness, corner radius, etc.) of the inspected PCBs based on the X-ray images.

Top-Down X-Ray Image for PCB

In particular embodiments, the X-ray inspection system may inspect manufactured PCB samples or products based on a single top-down X-ray image (or a single bottom-up X-ray image). The system may determine conductive material thickness of one or more elements of interest (e.g., conductive traces, PCB layers, plated-through vias, etc.) within the inspected PCBs in the orthogonal direction or the parallel direction with respect to the PCB surface plane based on a single top-down image. For example, for the orthogonal direction, the system may determine the conductive material thickness based on variation in X-ray absorption as represented by variation of image grayscale values. The system may use computer vision and computational analysis technologies to determine the material thickness distribution (e.g., profile or shape of associated elements of interest) based on one or more features in the single top-down image (e.g., edges, shapes, gradients, trends, grayscale values, etc.). In particular embodiments, the system may use the variation in grayscale values to determine the layouts of the conductive traces in the orthogonal direction or the parallel direction with respect to the PCB surface plane. For example, the system may use a machine-learning (ML) model, which is trained by historical data, to identify and locate one or more elements of interest in the X-ray images, isolate the elements of interest from other interfering elements (e.g., elements of the same or other layers that may overlap or intersect the elements of interest) in the X-ray images, and determine the PCB metrology information (e.g., trace length, width, thickness, distances between traces, layer thickness, layer distances, etc.) associated with the elements of interest (e.g., conductive traces, PCB layers, plated-through vias, etc.) based on a single top-down image.

Multiple X-Ray Images from Different Directions

In particular embodiments, the system may generate several X-ray images for the inspected PCBs from different angles. For example, the system may capture a top-down X-ray image for the inspected PCB and generate a second X-ray image for the inspected PCB from an oblique angle with respect to the PCB surface plane. The system may use the X-ray images from different angles to determine one or more features (e.g., staking order of multiple layers) and parameters (e.g., conductive material thickness, shapes, sizes, distances, relative positions, profile variations, gradients, etc.) related to the inspected PCBs. The system may use computer vision and computational analysis techniques to process the top-down image and the image generated from other angles to determine the stacking order of multiple layers of a PCB board and compute the distances between the layers in the orthogonal direction, the parallel direction, or any suitable direction with respect to the PCB surface plane. With a known angle of the oblique direction, the system may determine metrology information along the axis orthogonal to the PCB surface plane, the relative displacements of elements of interest, and/or the distances between the elements of interest in the orthogonal direction, the parallel direction, or any suitable direction with respect to the PCB plane surface.

In particular embodiments, the X-ray inspection system may measure the PCB metrology information based on a single top-down X-ray image or several X-ray images captured from different angles. By eliminating the need for large quantity of slice images like the traditional CT system, the X-ray inspection system may measure PCB metrology information in the orthogonal direction or the lateral direction with respect to the PCB surface plane or in any suitable direction in a three-dimensional space at a high speed, and therefore allow PCB manufacturers to monitor and control (e.g., in-situ and/or inline) the PCB manufacturing process to have a much lower defective rate. For applications that require screening hundreds or thousands of PCB products, the X-ray inspection system may dramatically reduce the inspection time (e.g., from hours to a few seconds per PCB sample) improving the speed of the inspection process. For example, the X-ray inspection system may take a few seconds or less to generate a single image to perform the inspection while the traditional CT system may take many hours to create X-ray images for cross-section images. In particular embodiments, the X-ray inspection system may generate X-ray images at least 100 times faster than traditional CT system and the inspection algorithm (e.g., machine-learning models) may inspect samples at least 1000 times faster than the traditional CT system. In particular embodiments, the X-ray inspection system may be capable of inspecting PCBs with a much larger size than those of the traditional CT system. In particular embodiments, the X-ray inspection system may be capable of inspecting every element of interest (e.g., sheet layers, conductive traces, plated-through vias) in a PCB (e.g., with an inspection throughput of 2 inches by 2 inches per minute).

PCB Metrology Information

In particular embodiments, the X-ray inspection system may inspect a number of PCB products to determine the metrology information of the inspected PCB products. In particular embodiments, the PCB metrology information determined based on the X-ray inspection may include one or more dimensions related to the inspected PCBs including, for example, but not limited to, a layer thickness, a distance between PCB layers, a conductive trace layout, a trace width, a trace length, a trace thickness, a trace path radius, a trace corner radius, a distance between conductive traces, a thickness of substrate, a location of a plated-through vias, a dimension (e.g., a via diameter, a pad diameter, a via depth, a shape, a size, a profile, etc.) related to a plated-through vias, etc. In particular embodiments, the PCB metrology information determined based on the X-ray inspection may further include a distance between two elements of interest. The element of interest may include, for example, but are not limited to, a PCB layer, a conductive trace, a plated-through via, a die, a substrate, etc. In particular embodiments, the distance may be measured along a vertical direction, a lateral direction, a Z-direction, or any direction in a three-dimensional space. In particular embodiments, the measured metrology information may further include, for example, but are not limited to variations of one or more of the measured dimensions.

Database and PCB Models

In particular embodiments, the system may store the X-ray inspection data (e.g., X-ray images, PCB metrology information) in a database (e.g., an operational database (ODB), a relational database or any suitable database). In particular embodiments, the X-ray inspection system may inspect a number of PCBs to measure the PCB metrology information (e.g., dimensions associated with the PCBs). In particular embodiments, the X-ray inspection system may inspect PCBs at a number of pre-determined locations on the PCBs to measure the PCB metrology information at these pre-determined locations. The X-ray inspection system may determine the PCB metrology information related to other locations of the PCBs based on interpolation on the metrology information at these measured locations. In particular embodiments, the X-ray inspection system may generate a PCB model (e.g., a 3D model) for an inspected PCB based on the measured PCB metrology information. In particular embodiments, the X-ray inspection system may generate a PCB model (e.g., a 3D model) for PCBs manufactured based on a particular PCB design. For example, the X-ray inspection system may inspect a number of representative PCB samples manufactured based on a particular PCB design to generate a PCB model by averaging the inspected representative PCB samples. In particular embodiments, the X-ray inspection system may generate a PCB model (e.g., a 3D model) for PCBs manufactured by a particular manufacturer based on a particular PCB design. For example, the X-ray inspection system may inspect a number of representative PCB samples manufactured by that particular manufacturer based on that particular PCB design to generate a PCB model by averaging the inspected representative PCB samples. In particular embodiments, the PCB models (e.g., 3D models) may be generated and updated by human engineers (e.g., manufacturer engineers, expert system engineers, users of the PCB design tool, or users of the X-ray inspection system). In particular embodiments, the PCB models (e.g., 3D models) may be generated and updated automatically by the X-ray inspection system using an artificial intelligence (AI) algorithm or/and a machine learning (ML) model. In particular embodiments, the database may be stored in a local storage space of the X-ray system or in a cloud-based remote server.

Compare PCBs with PCB Designs

Verify PCB Parameters

In particular embodiments, an X-ray inspection system may be used to inspect the manufactured PCB samples or PCB products to verify that the parameters (e.g., layer thickness, layer distances, conductive trace dimensions, etc.) of the manufactured PCBs are within specification ranges as specified by the PCB designers. In particular embodiments, the system may determine the metrology information (e.g., metrology parameter values) of the manufactured PCBs and compare this metrology information to the corresponding specification information (e.g., pre-determined ranges) as specified in the PCB design. For example, the system may determine that a distance between two conductive traces is 50 microns based on X-ray inspection data. The system may compare the measured distance of 50 microns to a corresponding pre-determined range of 45±7 microns for this particular distance parameter as specified by the PCB designer. The system may determine that this distance parameter satisfies the criteria corresponding this pre-determined range. As another example, the system may determine that a distance between two conductive traces is 60 microns based on X-ray inspection data. The system may compare the measured distance of 60 microns to a corresponding pre-determined range of 45±7 microns for this particular distance parameter as specified by the PCB designer. The system may determine that this distance parameter fails to satisfy the criteria corresponding this pre-determined range.

Systematical Errors for Electrical Parameters

Figure 4A:
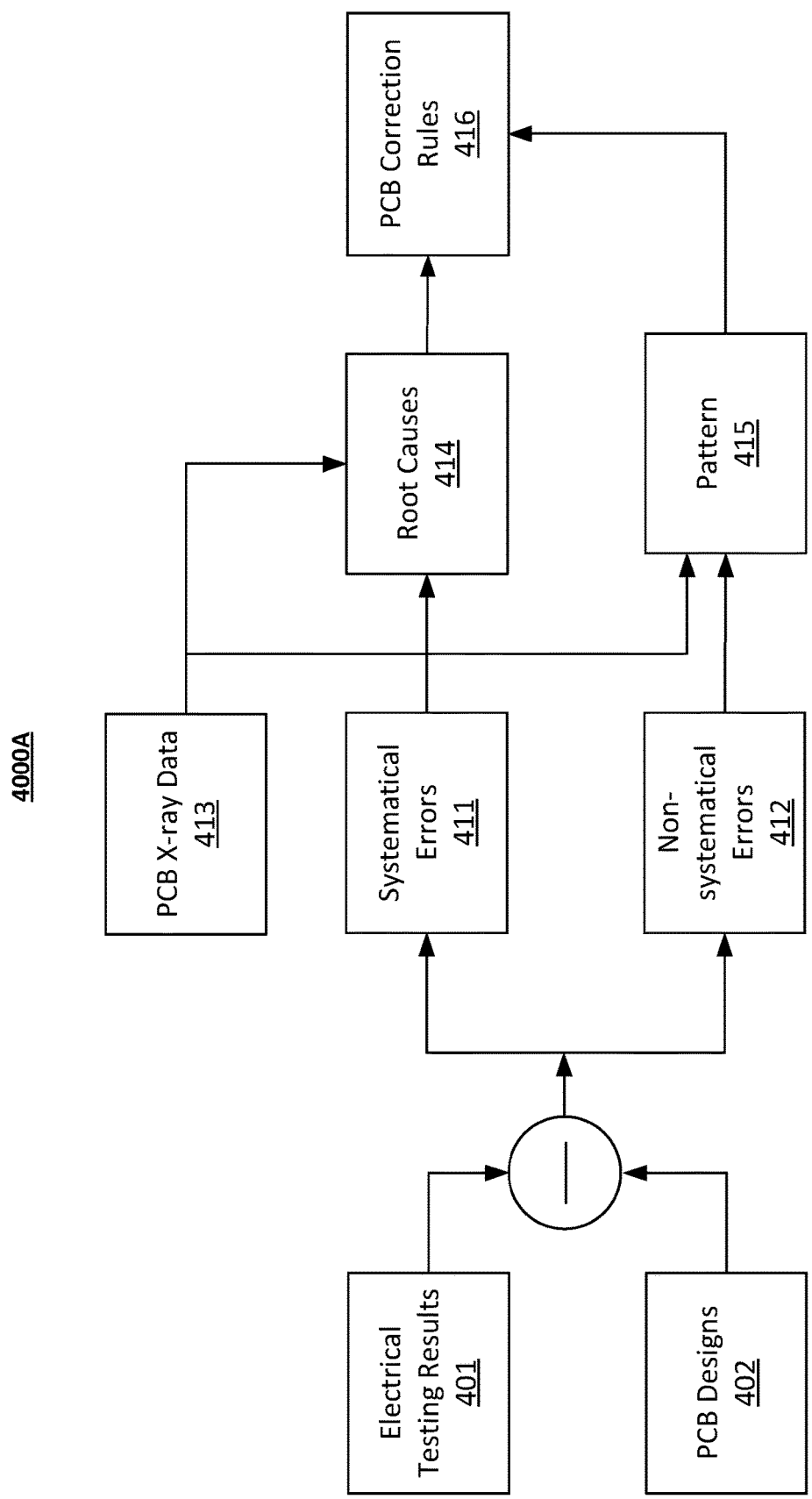
FIG. 4A illustrates an example process for determining errors of PCB electrical parameters with respect to corresponding PCB designs.

FIG. 4A illustrates an example process 4000A for determining errors of PCB electrical parameters with respect to corresponding PCB designs. In particular embodiments, the system may electrically test manufactured PCBs (e.g., using electrical testing equipment) to measure the electrical parameters of the PCBs (e.g., impedance parameters, inductance, capacitance, resistance, operating frequency, attenuation, etc.). The system may compare the measured electrical parameters to corresponding target parameter ranges as specified by the PCB designer. By comparing the measured electrical parameters of the actual PCB samples to the target ranges as specified by the PCB designer, the system may identify systematical errors (or differences) 411 and non-systematical errors (or differences) 412 (e.g., random errors) of these electrical parameters in the manufactured PCBs with respect to the corresponding PCB designs. In particular embodiments, the system may identify a systematical error (e.g., a parameter bias) based on a determination that the error is relatively consistent (e.g., within a pre-determined threshold range) over time and relatively consistent (e.g., within a pre-determined range) across multiple PCBs. In particular embodiments, the system may identify a systematical error based on a determination that the error is associated with an indicative feature or identifiable trend that can be consistently predicted. As an example and not by way of limitation, the system may identify that, for a particular capacitance parameter, the measured capacitance value of the actual PCB is greater (e.g., for a difference value or a difference range) than the target value as set by the PCB designer and this is the case across a number of PCB samples that have been tested. The system may determine a systematical positive bias for that particular capacitance parameter. As an example and not by way of limitation, the system may identify that, for a particular inductance parameter, the measured inductance value of the actual PCB is smaller (e.g., for a difference value or a difference range) than the target value as set by the PCB designer and this is the case across a number of PCB samples that have been tested. The system may determine a systematical negative bias for that particular inductance parameter. As another example, the system may identify a transmission line designed for a particular operating speed has a impedance parameter falling outside the pre-determined target range because of the spacing variation of sheet layers that follows a particular variation trend. The system may determine a systematical error for the impedance parameter based on the spacing variation trend of the sheet layers.

Root Causes of Systematical Errors for Electrical Parameters

In particular embodiments, the system may use the PCB X-ray inspection data 413 (e.g., X-ray images, metrology information, etc.) to determine the root causes 414 of the systematical error 411 for the electrical parameters. Then, the system may determine one or more PCB correction rules 416 based on the identified root causes 414 of the systematical errors 411 for the electrical parameters. The PCB correction rules may be used in the rule-based PCB correction algorithm of the expert system for correcting PCB designs. As an example and not by way of limitation, a PCB design may have a transmission line that needs to have certain impedance parameter values as specified by the PCB specification. One or more PCB samples may be manufactured based on the PCB design. Then, the PCB samples may be tested electrically to measure the impedance parameter of this transmission line. The measured impedance may be compared to the corresponding target ranges (as specified in the PCB design and specification) to determine whether the impedance parameter satisfy the pre-determined criteria corresponding the target range. In some scenarios, the impedance parameter of that transmission line in the PCB samples may fall in the pre-determined target ranges and satisfy the pre-determined criteria. In some other scenarios, one or more parameters associated with the impedance of that transmission line may fall out of the pre-determined target range and fail to satisfy the corresponding pre-determined criteria. The X-ray inspection system may inspect the PCB samples to measure their metrology information. The PCB inspection data 413 including the PCB metrology information may be compared to the corresponding PCB designs to identify the root causes why these parameters fall out of the pre-determined target ranges. For example, the non-conforming transmission line may have a conductive trace having a width that is beyond a corresponding target range and causing the impedance parameters of that transmission line to fail out the target range.

Systematical Errors for Metrological Parameters

Figure 4B:
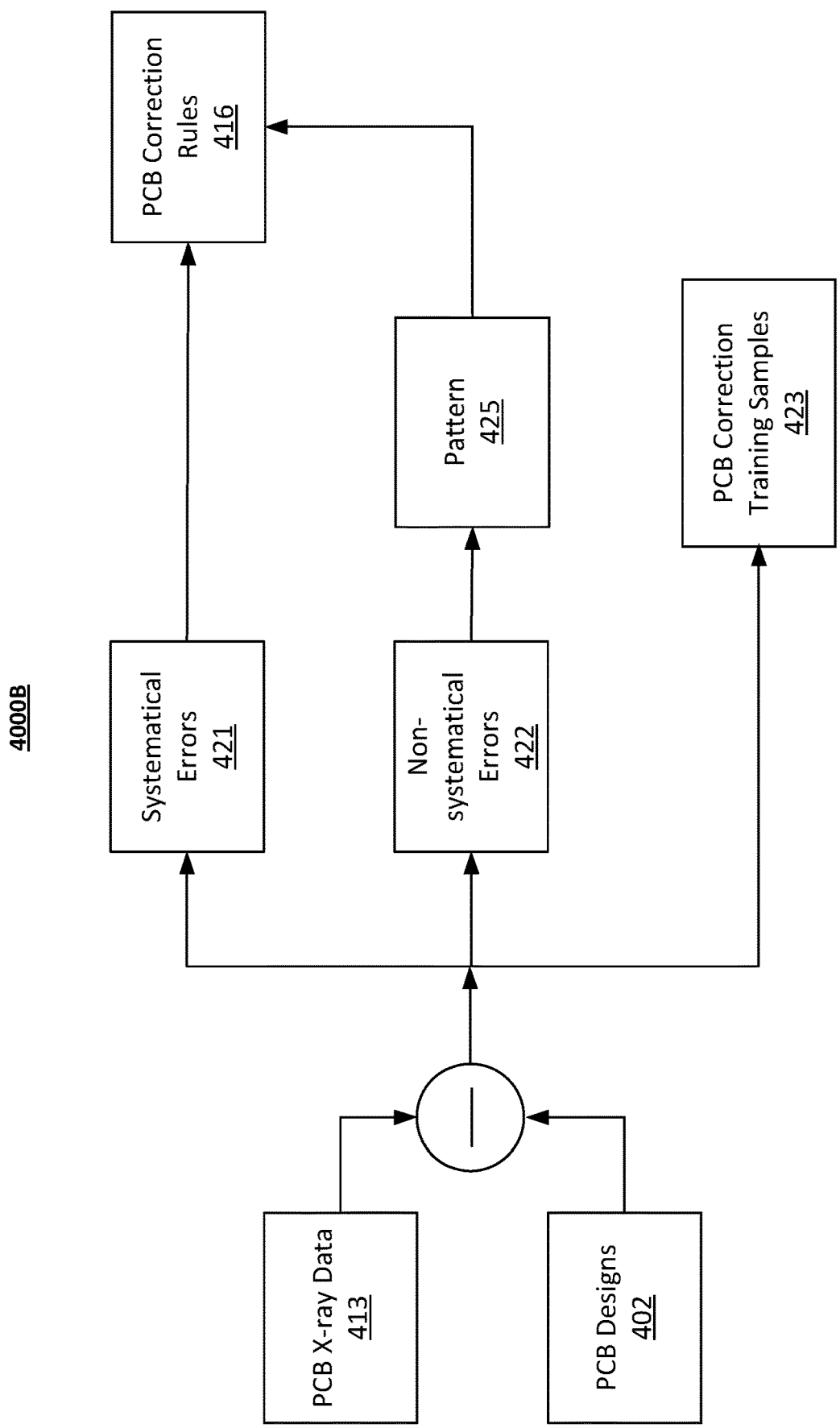
FIG. 4B illustrates an example process for determining errors of PCB metrological parameters with respect to corresponding PCB designs.

FIG. 4B illustrates an example process 4000B for determining errors of PCB metrological parameters with respect to corresponding PCB designs. In particular embodiments, the system may inspect manufactured PCBs using X-rays and compare the PCB X-ray inspection data 413 of these PCBs to corresponding PCB designs 402 with corresponding specification as specified by the PCB designer. By comparing the actual PCB samples or products to the intentions of PCB designers, the system may identify systematical errors (or differences) 421 and non-systematical errors (or differences) 422 (e.g., random errors) of the metrological parameters of the manufactured PCBs with respect to the corresponding PCB designs. In particular embodiments, the system may identify a systematical error (e.g., a parameter bias) based on a determination that the error is relatively consistent (e.g., within a pre-determined range) over time and relatively consistent (e.g., within a pre-determined range) across multiple PCBs. In particular embodiments, the system may identify a systematical error based on a determination that the error is associated with an indicative feature or identifiable trend that can be consistently predicted. In particular embodiments, the systematical errors may depend on the PCB design. In particular embodiments, the systematical errors may depend manufacturing tools.

As an example and not by way of limitation, the system may identify that a conductive trace has a width that is wider (e.g., by a difference value or difference range) than the target width as specified in the PCB design and this is the case across a number of inspected PCBs. The system may identify a positive bias for the width of that conductive trace. As an example and not by way of limitation, the system may identify that a conductive trace path has a corner radius that is greater (e.g., by a difference value or a difference range) than the target corner radius as specified in the PCB design and this is the case across a number of inspected PCBs. The system may identify a positive bias for the corner radius of that conductive trace path. In particular embodiments, the system may determine one or more PCB corrections rules 416 based on the identified systematical error 421 of the metrological parameters and these PCB correction rules may be used in the rule-based algorithm of the expert system for correcting PCB designs. In particular embodiments, the system may generate a number of PCB correction training samples 423 based on the difference of the metrological parameters of the inspected PCBs and the corresponding PCB designs. The PCB correction training samples 423 may be used to train the ML model of the expert system for correcting PCB designs based on ML model inference. In particular embodiments, the expert system may use the ML models or/and rules in the rule-based algorithm to capture the knowledge of the manufacturer engineers (e.g., rules, experiential knowledges) and the knowledge learned based on the comparison of actual PCBs and corresponding PCB designs.

Non-Systematical Errors

As illustrated in FIG. 4A, in particular embodiments, the system may identify non-systematical errors 412 (e.g., random errors) of the electrical parameters of the PCBs with respect to corresponding target values. The system may analyze (e.g., using a ML model) these non-systematical errors 412 together with the corresponding PCB X-ray inspection data 413 to identify one or more patterns associated with these non-systematical errors. Then, the system may determine one or more PCB correction rules 416 based on the identified patterns 415. As illustrated in FIG. 4B, in particular embodiments, the system may identify non-systematical errors 422 (e.g., random errors) of the metrological parameters of the PCBs with respect to corresponding target values. The system may analyze (e.g., using a ML model) these non-systematical errors 422 to identify one or more patterns 425 associated with these non-systematical errors. Then, the system may determine one or more PCB correction rules 416 based on the identified patterns 425.

In particular embodiments, the non-systematical errors of the electrical parameters or metrological parameters may be caused by one or more factors associated with the PCB manufacturing process or equipment. For example, the non-systematical errors may include a drifting PCB parameter caused by a drifting equipment parameter. As another example, the non-systematical errors may include random errors (e.g., alignment between different layers) caused by a random variation (e.g., glue moving randomly) of the manufacturing process or equipment. As another example, the non-systematical errors may include non-random errors (e.g., alignment between different layers) that have some trends or features caused by a non-random variation (e.g., glue moving from areas with more copper to areas with less copper) of the manufacturing process or equipment. As another example, the non-systematical errors may include random errors caused by material properties that are not well controlled.

Automatic Corrections

In particular embodiments, as illustrated in FIG. 2B, the expert system may receive a PCB design (e.g., from a PCB design tool) and may analyze the PCB design to generate one or more automatic corrections for that PCB design. In particular embodiments, the automatic corrections may be related to the impedance variations caused by factors such as layer thickness variations of the PCB. In particular embodiments, the automatic corrections may include modification to the PCB design to tune impedance of the PCB to be independent of locations over the PCB. In particular embodiments, the PCB may have transmission line impedances tuned to a target impedance of, for example, but not limited to 47.5 Ohms. In particular embodiments, the PCB may have transmission line impedances tuned to a target impedance of, for example, but not limited to 100 Ohms. In particular embodiments, the automatic corrections may include adjustment to one or more parameters including, for example, but not limited to a width of the metal arm or conductive trace, a length of the metal arm or conductive trace, a local thickness of conductive trace, a distance between conductive traces, a roughness of a conductive trace surface, a sheet layer thickness, a distance or spacing between layers, a corner radius of a conductive trace path, a location of a plated-through via, a dimension associated with a plated-through via, etc. In particular embodiments, the automatic corrections may include adjustment to the parameters of the conductive trace to tune the impedance based on layer thickness variations. In particular embodiments, the impedance of the PCB may be tuned by a resistor portion or an adjustable knob portion for tuning that impedance. In particular embodiments, the impedance of the PCB may be tuned based on the topology map of the PCB.

Feedback to PCB Design and Feedforward for Process Control

Direct Feedback to PCB Design

In particular embodiments, the system may inspect one or more manufactured PCBs using X-rays and compare the X-ray inspection data of the one or more PCBs to a corresponding PCB design from which these PCBs are manufactured. By comparing the actual PCBs to the corresponding PCB design, the system may identify errors or difference in metrological parameters of the manufactured PCBs with respect to the corresponding PCB design and parameter specification. In particular embodiments, the system may identify an error or difference between the PCBs and the corresponding PCB design related to one or more parameters including, for example, but not limited to, a width of the metal arm or conductive trace, a length of the metal arm or conductive trace, a local thickness of conductive trace, a distance between conductive traces, a roughness of a conductive trace surface, a sheet layer thickness, a distance or spacing between layers, a corner radius of a conductive trace path, a location of a plated-through via, a dimension associated with a plated-through via, etc. In particular embodiments, the system may generate one or more corrections for that particular PCB design based on the identified error or difference of metrological parameters of the manufactured PCBs with respect to the corresponding PCB design and parameter specification. The system may provide the generated corrections to the PCB design tool or/and the PCB designer to correct that particular PCB design.

Feedforward to Manufacturing Process

In particular embodiments, the system may identify one or more parameters of the manufacturing process or equipment that contribute to the errors or difference (e.g., systematical or non-systematical) between the PCBs and corresponding PCB designs. The system may generate and send feedforward information (e.g., instructions or/and data) to one or more related manufacture tools used in the manufacturing process to cause the manufacture tools to adjust the related parameters. The manufacturing tools with the adjusted parameters may reduce or eliminate the errors or difference between subsequently manufactured PCBs and corresponding PCB designs. For example, the system may identify a drifting alignment parameter related to the PCB manufacturing process and may send instruction and data (e.g., drifted values) to the related manufacturing tools to adjust that alignment parameter and stop that parameter from drifting. In particular embodiments, the provided feedback/feedforward information may be communicated using any communication methods including, for example, but not limited to, over a local area network (e.g., a wired network or wireless network), over a telecommunication network, through an intermediary computer, etc.

Example Method

Figure 5:
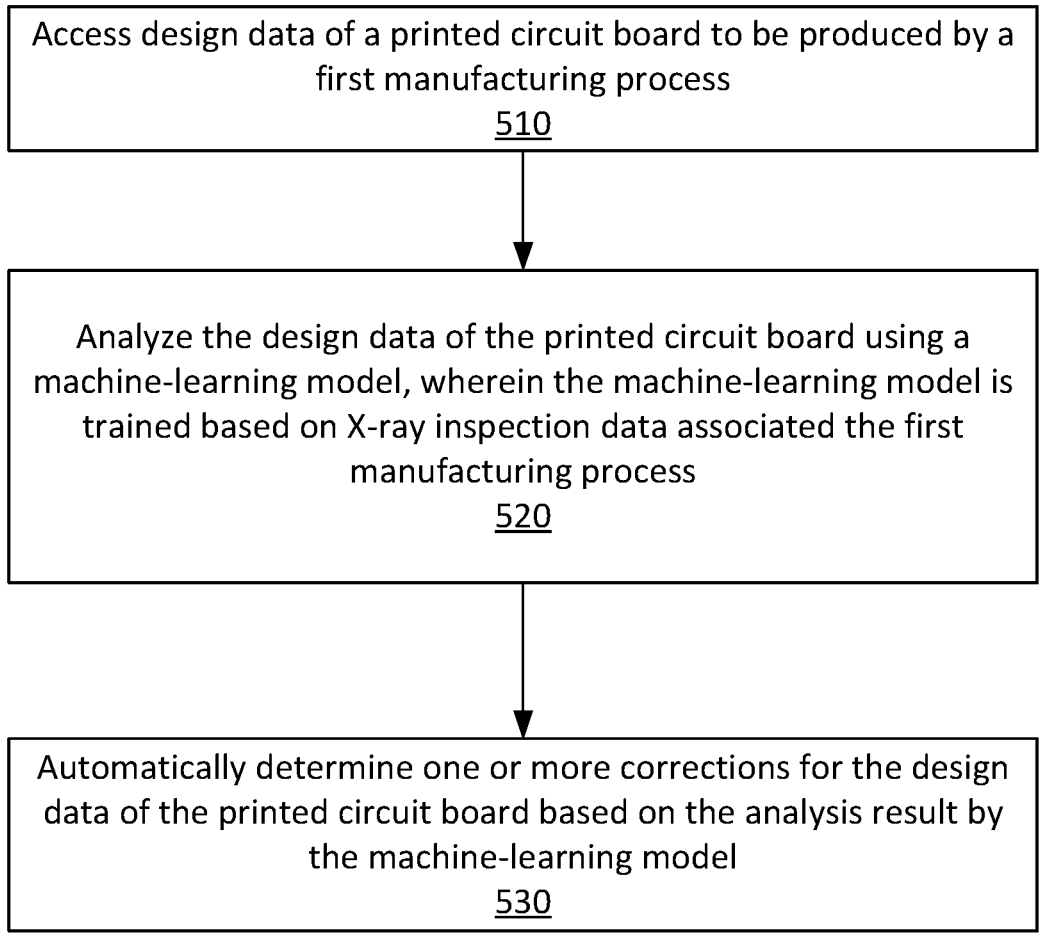
FIG. 5 illustrates an example method for automatically generating corrections for a design of printed circuit board.

FIG. 5 illustrates an example method 5000 for automatically generating corrections for a design of printed circuit board. The method may begin at step 510, where a computing system may access design data of a printed circuit board to be produced by a first manufacturing process. At step 520, the system may analyze the design data of the printed circuit board using a machine-learning model. The machine-learning model may be trained based on X-ray inspection data associated with the first manufacturing process. At step 530, the system may automatically determine one or more corrections for the design data of the printed circuit board based on the analysis result by the machine-learning model. In particular embodiments, the machine-learning model may be trained using a number of training samples generated based on the X-ray inspection data. The X-ray inspection data may be associated with printed circuit boards that are manufactured by the first manufacturing process. In particular embodiments, the machine-learning model may be trained using a number of pre-labeled training samples. The pre-labeled training samples may be generated by manufacturing engineers based on experiential knowledge during a human correction process. In particular embodiments, the system may provide the one or more corrections for the design data of the printed circuit board to a design tool used for creating the design data of the printed circuit board or to a user of the computing system (e.g., hosting the expert system).

In particular embodiments, the system may automatically modify the design data of the printed circuit board based on the one or more corrections. The system may provide the modified design data of the printed circuit board to the first manufacturing process. The printed circuit board may be manufactured based on the modified design data of the printed circuit board using the manufacturing process. In particular embodiments, the one or more corrections may adjust one or more parameters associated with an impedance of the printed circuit board to tune the impedance to be independent from layer thickness variations in the printed circuit board. The impedance with the one or more adjusted parameters may be independent from layer variations of the printed circuit board. In particular embodiments, the system may determine a root cause associated with a difference between the design data of the printed circuit board and the printed circuit board manufactured by the first manufacturing process. The system may generate feedforward information based on the root cause. The system may provide the feedforward information to a manufacture tool used in the first manufacturing process to cause the manufacturing tool to adjust one or more parameters associated with the root cause. In particular embodiments, the one or more corrections may adjust one or more parameters associated with the printed circuit board comprising one or more of: a width of the metal arm or conductive trace, a length of the metal arm or conductive trace, a local thickness of conductive trace, a distance between conductive traces, a roughness of a conductive trace surface, a sheet layer thickness, a distance or spacing between layers, a corner radius of a conductive trace path, a location of a plated-through via, or a dimension associated with a plated-through via. In particular embodiments, the system may analyze the design data of the printed circuit board using a rule-based algorithm comprising a plurality of rules. The one or more corrections may be further determined based on one or more rules of the rule-based algorithm. In particular embodiments, one or more rules of the rule-based algorithm may be generated based on pre-determined parameters related to the manufacturing process. The pre-determined parameters may be determined based on experiential knowledge of manufacture engineers related to the manufacturing process. In particular embodiments, one or more rules of the rule-based algorithm may be generated based on the X-ray inspection data associated with previously manufactured printed circuit boards. The previously manufactured printed circuit boards may be manufactured by the first manufacturing process. In particular embodiments, the system may determine a difference between previous design data and a corresponding previous printed circuit board manufactured by the first manufacturing process based on the previous design data. The system may determine a root cause associated with the difference between the previous design data and the corresponding previous printed circuit board manufactured by the first manufacturing process. One or more rules of the rule-based algorithm may be determined based on the root cause.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for automatically generating corrections for a design of printed circuit board including the particular steps of the method of FIG. 5, this disclosure contemplates any suitable method for automatically generating corrections for a design of printed circuit board including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Advantages: Inspection Speed

A significant advantage of this invention is that an extended source of X-rays can be used, increasing the available flux of X-rays used for imaging. This in turn increases the throughput possible for the system. Put another way, in the time to acquire a single inspection image with a PPM system, the proposed invention can acquire over 300,000 images with the same resolution.

Consider the following comparison with the PPM X-ray system. The time to acquire an image depends on the flux $\Phi$ of X-rays:

$$T_{acquire} = P_\# \times X_P / \Phi$$

where $P_\#$ is the number of pixels, $X_P$ is the number of X-rays per pixel, and $\Phi$ is the X-ray flux. The X-ray flux from a point source is:

$$\text{Flux} = \Phi = \beta \times \Omega \times S_A$$

where $\beta$ is the point source brightness, $\Omega$ is the angular distribution in mrad$^2$ and $S_A$ is the point source area $S_A = \pi r^2$. The source spot size for X-ray systems is typically defined using the ASTM standard SE-1165 ["Standard Test Method for Measurement of Focal Spots of Industrial X-ray Tubes by Pinhole Imaging," ASTM Committee E-7 on Nondestructive Testing, May 15, 1992].

A typical X-ray source brightness $\beta$ is $$\beta = 10^8 \text{ X-rays/sec/mm}^2/\text{mrad}^2.$$

To avoid parallax errors in automated inspection, the PPM X-ray beam should be well collimated; a divergence of 20 mrad is typical. For a point source with $$\Omega = (20 \text{ mrad})^2 = 400 \text{ mrad}^2$$

and a source spot diameter $d = 2r = 1$ μm $= 10^{-3}$ mm, the flux is given by:

$$\text{Flux} = \Phi = \beta \times \Omega \times S_A$$

$$= 10^8 \times 400 \times \pi \times [0.5 \times 10^{-3}]^2 \text{ X-Rays/Sec}$$

$$= 400 \times \pi \times 0.25 \times 10^8 \times [10^{-3}]^2 \text{ X-rays/sec}$$

$$= 400 \times \pi \times 25 \text{ X-rays/sec}$$

$$= 31,416 = 3.14 \times 10^4 \text{ X-rays/sec}.$$

A typical X-ray image sensor may have 512×512 pixels that need 1,000 X-rays/pixel for image formation. An image for a PPM system will therefore be collected in approximately 8,350 seconds, or 2.3 hours.

On the other hand, keeping the same source brightness, but illuminating with a larger source spot size according to the invention dramatically increases the X-ray flux illuminating the object. As an example, assume a source with a 1 mm diameter (r=0.5 mm) separated by 100 mm from the object and, furthermore, assume that the distance from the object to scintillator is 100 microns. The angular divergence of the X-ray beam is given by:

$$\alpha = 1 \text{ mm}/100 \text{ mm} = 10 \text{ mrad},$$

making $$\Omega = 100 \text{ mrad}^2.$$

The spot area is $= \pi \times [0.5]^2 = 0.785$ mm$^2$, so the flux becomes:

$$\text{Flux} = \Phi = 10^8 \times 100 \times 0.785 \text{ photons/sec}$$

$$= 7.85 \times 10^9 \text{ photons/sec}$$

which is higher than the PPM configuration by a factor of 250,000 times. Therefore, the same 512×512 image (with 1,000 X-rays per pixel) can now be produced at high speed and, for example, may now have a proportionally faster image collection time of approximately 33 msec.

As a practical matter, the throughput enhancement may be further reduced by a factor of between 2 and 10 from this number. A PPM imaging system can detect X-rays in the enlarged shadow image directly with a CCD X-ray detector, which can have a quantum efficiency between 50% to 100%. The typical X-ray CCD array comprises an array of pixels, with a pixel size of approximately 100 μm×100 μm.

In comparison, the high-resolution direct-shadow images for the system of the disclosed invention come from an extended X-ray source, and are not magnified. The pixels of contemporary X-ray imaging detectors are far too large to resolve the proximity images. Instead, the invention disclosed here comprises a scintillator to convert the X-rays to optical photons, and then magnifies this optical image.

In order to achieve a particular resolution, there may be thickness specifications for the scintillator. For a resolution of 1 micron, for example, the scintillator may have a specified thickness between 1 and 10 microns. For thin scintillators, some of the incident X-rays will pass through the scintillator without being absorbed. Therefore, the quantum efficiency of this conversion process may worse than the PPM system, emitting visible photons for approximately 20% of the X-rays passing through the scintillator. Beyond this, the microscope may lose additional photons, depending on the optical system NA and the quantum efficiency of the visible CCD detector. However, even with these losses, the benefit provided by the higher flux of the extended source still provides a significant advantage.

Advantages: Imaging Resolution

The resolution of the prior art PPM system is determined by the spot size of the X-ray source. For example, a source with a 1 micron spot size will produce images with 1 micron resolution, assuming the system is operating at optimal resolution. Practically speaking, it is difficult to achieve resolution much below 1 micron with a PPM system, due to rapidly decreasing efficiency of the X-ray source for small spot sizes. As the spot size of the X-ray source decreases, the X-ray power must be reduced to avoid melting the X-ray target. Furthermore, the X-ray target must be made thinner, to reduce scattering in the target. As a result, for each 2× decrease in spot size, the flux from the source decreases a factor of about 10×.

For the imaging system according to the invention, the scintillator is in close proximity to the object being examined, and photons emitted are in proportion to the X-rays. For the optical system that relays the photons emitted by the scintillator to the detector, assuming a scintillator emission wavelength of λ=535 nm and a solid immersion optical system with NA≈1.75 comprising LuAG optical elements with refractive index n=1.84, the definition for the diffraction-limited resolution R of the optical system relaying scintillator photons to the detector is:

$$R = \frac{\lambda}{2*NA} = \frac{535 \text{ nm}}{2*1.75} = 153 \text{ nm}$$

which is 6.5 times smaller than the 1 micron resolution of the PPM system.

Advantages: Time to Market

The high speed at which non-destructive images at resolutions smaller than 50 microns can be gathered can improve the time to market for the development of manufacturing processes such as the flip chip interconnect (FCI) process described earlier. The destructive processes for failure analysis, also described earlier, can take weeks to collect a single image, and months to acquire statistical data on parts. Because of the rapid time in which images can be collected and analyzed using the system of the present invention, process development time for such products can be counted in days, and is typically a fraction of the total time required to design and bring to market a new product.

Furthermore, because of the enhanced resolution, the present invention can be used for the new FCI processes with pitches smaller than 50 microns. The present invention can be used for significantly smaller pitches, and still maintain the desired image resolution and speed. In terms of the product development cycle, an increase in time for feedback of one to several weeks has a distinct and significant impact on the time required to develop a new product. In a simple case, perhaps three to five cycles of setup and data collection may be sufficient to establish a process for a new device. In a more complex case, such as a high-density interposer or a 3D IC, tens or hundreds of iterations may be required. Without the present invention, each of these cycles may take several weeks, and the total time to market of the product may come to be dominated by these cycles. Clearly a method of determining the quality of fine pitch (50 microns and smaller) bonds at the time of processing offers a significant advantage.

The images and calculations produced by the system and methods disclosed herewith allow the quality of bonds to be examined immediately after bonding in a matter of seconds or minutes. In order to develop and qualify a new semiconductor product for mass production, many individual processes and the integration of these processes must be established, tuned, and tested. In the case of forming a through-silicon via (TSV) in a semiconductor wafer, the process flow typically requires that the vias be formed first and the capture pads be subsequently formed on the wafer surface over the vias. Since the capture pads obscure optical inspection of the vias themselves, in the absence of the present invention, the alignment between the vias and the capture pads may not be accurately determined at the time of manufacturing without cutting the silicon wafer and inspecting this feature in cross-section. Since this procedure is time consuming and also destroys the silicon wafer and any economic value contained within it, it is therefore undesirable.

In the case of bonding two or more chips or substrates or even complete wafers together using FCI, the alignment, bonding forth, bonding temperature, rate of heating, and rate of cooling among other factors must be tightly controlled. While control of manufacturing equipment and processes can enable some of the necessary control, inspection and measurement of features within the product that are not optically visible may also be required. Without the use of the apparatus disclosed in this invention, assembled parts must be cross-sectioned in order to be inspected. Given the fine pitch of the interconnect bonds and the very large quantity of connections, this procedure can take several weeks. Typically only a very small subset of the total interconnect bonds may actually be inspected.

The inability to inspect bonds quickly can add significantly to the length of time required to fine tune both individual process steps as well as the integration of multiple process steps to create a finished product. For example, consider a case where 25 iterations of the bonding process are required to develop and qualify a product. In the case without the apparatus disclosed in this invention, each iteration may require 1 week to build each group of samples under various process and tooling configurations. After manufacturing a group of samples, an additional 2 weeks may be required to cross-section individual units and inspect the quality and attributes of the bonds that have been created. The total time is therefore: 25 cycles×(1 week making+2 weeks inspection)=75.0 weeks.

With the use of the apparatus disclosed in this invention, the 2 weeks of inspection can be reduced to a few minutes by eliminating the need for time consuming cross-sectioning. The total time for the sequential cycles may now be calculated as: 25 cycles×(1 week making+1 hour inspection)= 25.15 weeks, a reduction by 49.85 weeks (or 66% of the initial time to market). With high-volume consumer electronic devices such as mobile phones selling in volumes of more than 100 million units a year, it can be easily seen that a decrease in time to market by 50 weeks (almost one year) can have significant impact on the market. The apparatus may further be integrated into the bonding tool or via filling tool, for example the electrochemical deposition tool, to provide feedback to the bonding process in real time. The use of the apparatus in this way reduces time to market by many weeks and may in fact enable a product to enter the market that otherwise would be too costly or too late to market to have economic value.

Advantages: Product Yield and Cost

It has been reported that commercial production began on these devices with overall yields related to package assembly and interconnect in the range of 80%. This yield is far lower than typically accepted in the semiconductor field, and there is considerable additional cost associated with the scrap material. However, this particular part was determined to have such high commercial value that, even considering the cost associated with low yield, it was commercially feasible to produce with only 80% package assembly yield. In other lower-cost, more consumer-oriented segments of the market, pressure on pricing is much more intense, and it is unlikely that a product with package assembly yields at this level could be commercially viable. For this reason, it is necessary for the manufacturing process to be highly capable and tightly controlled, such that the amount of scrap product or yield loss resulting from the bonding process is reduced. Traditionally, package assembly yields are in the 98 to 99% range. Those skilled in the art will quickly realize that scrapping good chips by using poorly yielding bonding techniques, and packaging yields of 80% for lower value chips, are simply not acceptable.

It should be noted that, in the case of multiple dice mounted together either as a 3D IC or onto a high-density interposer, the failure of one connection on any chip will result in the scrapping of the entire MCP or package assembly. There may be thousands or tens of thousands of connections that must all function as designed. It is rare that any kind of rework or recovery of materials can be accomplished if any of the bonds are not produced correctly. For example, take the case when a processor chip with a cost of $10 is mounted together with four memory chips costing $5 each, or $20. The total cost of the chips is therefore $30. Chip assembly and packaging may add another $5 of cost for a total assembly cost of $35.

By using the images and measurements produced by the apparatus in this disclosure, the processes of aligning, inspection bonding can be controlled and monitored such that the yield can be rapidly increased. For MCP packages, in the example above, detecting a flaw between the first two dice will allow the packaging assembler to scrap the first two die only, and not require the loss of all five dice, therefore saving scrap costs and improving yield. It is common for well-controlled and monitored assembly processes to have yields of over 99.9%. The present invention allows a packaging assembler to achieve a yield of greater than or equal to 90% in MCP structures having more than 4 dice and having more than 100 TSVs per interposer or die layer at pitches where the smallest pitch is less than 100 microns. The same yield advantage may be achieved in the flip chip configuration having more than 400 microbumps at a pitch where the smallest pitch is less than 100 microns.

This same advantage in cost and yield can be seen at other steps in the manufacturing process for fine-pitch interposers and 3D die stacking, such as via fill monitor for voids, via capture pad alignment to via, alignment of chip-bump to chip or interposer pad, and quality of completed joint after bonding. It may also be used to measure bondline in the assembly of multiple slices of silicon devices or fine pitch interposers or between silicon devices and other materials of interest where this bondline thickness is critical to device performance.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing design data of a printed circuit board to be produced by a manufacturing process;
   determining one or more corrections for the design data of the printed circuit board based on one or more correction rules for correcting one or more parameters associated with the printed circuit board; and
   automatically adjusting one or more of the parameters associated with the design data of the printed circuit board based on the one or more corrections, wherein the adjusted parameters are associated with an impedance of the printed circuit board, and wherein the one or more corrections cause the impendence of the printed circuit board to be independent from layer thickness variations of the printed circuit board to be produced by the manufacturing process.

2. The method of claim 1, wherein the one or more correction rules are determined based on X-ray inspection data associated with previous printed circuit boards that are produced by the manufacturing process.

3. The method of claim 1, wherein the one or more correction rules are determined based on a difference between previous design data and previous printed circuit boards that are produced by the manufacturing process based on the previous design data.

4. The method of claim 3, wherein the one or more correction rules are based on a root cause associated with the difference between the previous design data and the previous printed circuit boards that are produced by the manufacturing process based on the previous design data.

5. The method of claim 1, further comprising:
   providing the design data with the adjusted parameters to one or more computing systems associated with a manufacturing tool used in the manufacturing process, wherein the printed circuit board is produced based on the design data with the adjusted parameters by the manufacturing process using the manufacturing tool.

6. The method of claim 5, further comprising:
   determining a difference between the design data with the adjusted parameters and the printed circuit board produced by the manufacturing process;
   generating feedback information based on the determined difference between the design data with the adjusted parameters and the printed circuit board produced by the manufacturing process; and
   providing the feedback information to a manufacturing tool used in the manufacturing process to cause the manufacturing tool to adjust one or more manufacturing parameters associated with the manufacturing process.

7. The method of claim 5, further comprising,
   determining a difference between the design data with the adjusted parameters and the printed circuit board produced by the manufacturing process;
   generating feedforward information based on the determined difference between the design data with the adjusted parameters and the printed circuit board produced by the manufacturing process; and
   providing the feedforward information to a manufacturing tool used in a downstream process of the manufacturing process to cause the manufacturing tool to adjust one or more manufacturing parameters associated with the downstream process.

8. The method of claim 1, wherein the one or more parameters comprise one or more of:
- a width of a metal arm or conductive trace,
- a length of a metal arm or conductive trace,
- a local thickness of conductive trace,
- a distance between conductive traces,
- a roughness of a conductive trace surface,
- a sheet layer thickness,
- a distance or spacing between layers,
- a corner radius of a conductive trace path,
- a location of a plated-through via, or
- a dimension associated with a plated-through via.

9. The method of claim 1, wherein the one or more parameters are associated with one or more performance parameters of the printed circuit board comprising one or more of:
- a signal transmission speed,
- a data transmission rate,
- a number of layers,
- a design layout,
- a design pattern of conductive traces,
- a layer thickness, or
- a layer thickness variation trend.

10. The method of claim 1, wherein the one or more correction rules are associated with a plurality of pre-determined parameters of the manufacturing process.

11. The method of claim 1, wherein the one or more correction rules are determined based on experiential knowledge or theoretical knowledge associated with the manufacturing process.

12. The method of claim 1, wherein the one or more correction rules are determined based on X-ray inspection data of previous printed circuit boards produced by the manufacturing process.

13. The method of claim 1, wherein the one or more corrections are generated based on a combination of the one or more correction rules and inference results of a machine-learning model that is trained based on X-ray inspection data of previous printed circuit boards produced by the manufacturing process.

14. The method of claim 1, wherein the one or more correction rules are updated based on subsequently obtained knowledge associated with the manufacturing process, and wherein the subsequently obtained knowledge comprises experiential knowledge about a difference between the design data of the printed circuit board and subsequent printed circuit boards produced by the manufacturing process based on the design data of the printed circuit board.

15. The method of claim 1, wherein the one or more correction rules are updated based on subsequent X-ray inspection data of subsequent printed circuit boards produced by the manufacturing process.

16. The method of claim 1, wherein the one or more correction rules are generated by a machine-learning model that is trained based on X-ray inspection data of previous printed circuit boards produced by the manufacturing process.

17. The method of claim 16, wherein the one or more correction rules are updated by the machine-learning model after the machine-learning model is trained based on subsequent X-ray inspection data of subsequent printed circuit boards produced by the manufacturing process.

18. The method of claim 1, wherein the one or more correction rules are customized to the manufacturing process.

19. One or more computer-readable non-transitory storage media embodying software that is operable when executed to:
- access design data of a printed circuit board to be produced by a manufacturing process;
- determine one or more corrections for the design data of the printed circuit board based on one or more correction rules for correcting one or more parameters associated with the printed circuit board; and
- automatically adjust one or more of the parameters associated with the design data of the printed circuit board based on the one or more corrections, wherein the adjusted parameters are associated with an impedance of the printed circuit board, and wherein the one or more corrections cause the impendence of the printed circuit board to be independent from layer thickness variations of the printed circuit board to be produced by the manufacturing process.

20. A system comprising one or more processors; and one or more computer-readable non-transitory storage media coupled to one or more of the processors and comprising instructions operable when executed by one or more of the processors to cause the system to:
- access design data of a printed circuit board to be produced by a manufacturing process;
- determine one or more corrections for the design data of the printed circuit board based on one or more correction rules for correcting one or more parameters associated with the printed circuit board; and
- automatically adjust one or more of the parameters associated with the design data of the printed circuit board based on the one or more corrections, wherein the adjusted parameters are associated with an impedance of the printed circuit board, and wherein the one or more corrections cause the impendence of the printed circuit board to be independent from layer thickness variations of the printed circuit board to be produced by the manufacturing process.

* * * * *